(12) United States Patent
Bedert et al.

(10) Patent No.: US 12,331,792 B1
(45) Date of Patent: Jun. 17, 2025

(54) IN-SHAFT SELECTIVE LUBE IMPLEMENTATION FOR A WET CLUTCH

(71) Applicant: Dana Belgium N.V., Flanders (BE)

(72) Inventors: Jan A. Bedert, Oostduinkerke (BE); Kurt Cattoor, Koolkerke (BE); Jan Markey, Wingene (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/632,159

(22) Filed: Apr. 10, 2024

(51) Int. Cl.
| | |
|---|---|
| *F16D 25/12* | (2006.01) |
| *F16D 13/72* | (2006.01) |
| *F16D 13/74* | (2006.01) |
| *F16K 11/07* | (2006.01) |
| *F16D 48/02* | (2006.01) |

(52) U.S. Cl.
CPC ........... *F16D 25/123* (2013.01); *F16D 13/72* (2013.01); *F16D 13/74* (2013.01); *F16K 11/07* (2013.01); *F16D 2048/029* (2013.01)

(58) Field of Classification Search
CPC .. F16D 13/72; F16D 13/74; F16D 2048/0221; F16D 2048/0224; F16D 2048/029; F16D 25/123; F16K 11/07
See application file for complete search history.

(56) References Cited

U.S. PATENT DOCUMENTS

| | | | |
|---|---|---|---|
| 3,823,801 A * | 7/1974 | Arnold | B63H 23/30 |
| | | | 192/85.63 |
| 5,613,588 A | 3/1997 | Vu | |
| 6,098,771 A | 8/2000 | Vu | |
| 9,841,067 B1 | 12/2017 | Logan et al. | |
| 11,585,393 B1 | 2/2023 | Gelmini et al. | |
| 11,608,864 B2 | 3/2023 | Gelmini et al. | |
| 2004/0159523 A1* | 8/2004 | Duan | F16D 48/066 |
| | | | 192/70.12 |
| 2011/0190990 A1 | 8/2011 | Nedachi et al. | |
| 2011/0208396 A1 | 8/2011 | Otanez et al. | |
| 2016/0010706 A1* | 1/2016 | Lundstrom | F16D 25/14 |
| | | | 192/85.01 |
| 2017/0089402 A1* | 3/2017 | Deakin | F16D 25/123 |
| 2023/0122398 A1* | 4/2023 | Voth | F16D 25/123 |
| | | | 192/3.58 |

OTHER PUBLICATIONS

Catoor, K. et al., "Wet Clutch Cooled PTO Disconnect," U.S. Appl. No. 63/560,386, filed Mar. 1, 2024, 31 pages.

* cited by examiner

Primary Examiner — Timothy Hannon
(74) Attorney, Agent, or Firm — McCoy Russell LLP

(57) ABSTRACT

A transmission system comprising: a lubrication valve that fluidly couples a lubrication line in fluidic communication with a multi-disc wet clutch; a clutch line in fluidic communication with a clutch actuator of the multi-disc wet clutch and the lubrication valve; a clutch control valve fluidly coupled to the clutch line; and a controller configured to adjust a pressure of the clutch line to open and close the lubrication valve based on wet clutch temperature.

10 Claims, 10 Drawing Sheets

IN-SHAFT SELECTIVE LUBE IMPLEMENTATION FOR A WET CLUTCH

TECHNICAL FIELD

The present description relates to a shaft incorporating a lubrication system including a main lubrication line and a selective lubrication line fluidly coupled to a wet clutch. A pressure activated valve may selectively open to the selective lubrication line wet clutch at higher speeds.

BACKGROUND AND SUMMARY

Vehicles, such as electrified vehicles, may have a transmission to switch gears of a plurality different ratios, where each of the different ratios may output different torques and rotational speeds with the same input torque. Electrified vehicles, including fully electric vehicles (EVs) and hybrid electric vehicles, may use electric machines to generate torque and power wheels of the vehicles. The electric machine may be included in an electric drivetrain, which may further include a transmission, a drive shaft, a drive axle, and one or more clutches for controlling torque from the electric machine to the wheels and other components therebetween. The transmission, such as a gearbox, may have a plurality of gearsets of different ratios (e.g., speed), where each gearset may output a different torque and rotational speed for the same input torque and rotational speed. A wet clutch may selectively and rotationally couple an input and an output each part of or coupled to two rotational elements, such as a shaft and a gear. The wet clutch may include an actuator, such as a piston assembly with a piston, where the piston may be actuated via hydraulic forces applied in an actuation chamber from increasing or decreasing pressure via hydraulic work fluid, such as oil. The piston may transfer force to a clutch pack including a plurality of separator plates and friction plates of the wet clutch. The force may compress the clutch pack, contacting the separator plates and friction plates to engage the clutch, selectively coupling and drivingly coupling the input and output of the clutch.

Wet clutches may experience drag torque, which may be understood as a residual torque when a clutch is disengaged due to the viscous effect of oil or other lubricants. Drag torque may cause continuous power losses, decreasing power transferred to the wheels and increasing energy consumption of a vehicle. The greater the volume of fluid housed by the clutch, the greater the drag torque. Reducing lubricant and other work fluid to the wet clutch may decrease the drag torque on the wet clutch. However, at higher speeds a wet clutch may experience greater friction and other buildup of thermal energy from the rotational energy and torque across the clutch. Without effective removal of thermal energy, the thermal energy may increase above a threshold degrade the clutch and surrounding components. To decrease drag torque and ensure desired lubrication for cooling the wet clutch, the shaft may incorporate a main lubrication line and a selective lubrication line. The main lubrication line supplies lubricant at a constant volume and the selective lubrication line may supply additional volume of fluid for specific circumstances. For example, the selective lubrication line may supply lubricant when a clutch is closed or closing. A selective lubrication sleeve in the counter-pressure chamber of a clutch may be moved by the piston of the clutch when the clutch closes, such that additional lubricant may flow from the selective lubrication line to the clutch. Electric machines may produce a greater rotational speed compared to other forms of prime movers, such as internal combustion engines (ICEs). During rotation, centrifugal loads may be applied across the hydraulic clutch and introduced to the pressure chamber of the piston. Higher rotational speeds input to the hydraulic clutch may result in higher centrifugal loads to the clutch. For example, above a threshold of pressure, the centrifugal load may cause the hydraulic clutch to self-close. Likewise, the centrifugal loads may cause degradation to components and features of the clutch, such as the piston and the pressure chamber. The centrifugal loads may effect engagement of the hydraulic clutch, and may be minimized or removed below a threshold of pressure. As the opening and closing of the selective lubrication line via the selective lubrication is affected by movement of the piston, self-closing may occur. Efforts to correct self-closing may also result in undesired clutch drag, as more lubricant may be used to stop and retract the piston after self-closing than stopping self-closing.

The inventors herein have recognized these and other issues with such systems. As developed in one example is a transmission system comprising: a lubrication valve that fluidly couples a lubrication line in fluidic communication with a multi-disc wet clutch; a clutch line in fluidic communication with a clutch actuator of the multi-disc wet clutch and the lubrication valve; a clutch control valve fluidly coupled to the clutch line; and a controller configured to adjust a pressure of the clutch line to open and close the lubrication valve based on wet clutch temperature.

The lubrication valve may be pressure activated, such that a pressure signal may open or close the lubrication valve. A first pressure signal of a higher pressure than a previous state may open the valve. At a second pressure signal of a lower pressure than a previous state, a spring force of a spring and a pressure of a first counter-pressure chamber for the lubrication valve may return the valve to a closed state. The lubrication valve may open or close the selective lubrication line. The first pressure signal to open the lubrication valve is less than the flow of pressure to actuate the clutch actuator and close the wet clutch. A pressure to advance the clutch actuator and close the wet clutch may open the valve. The valve may have a passage via which fluid may travel through. The valve may be a spool valve. Hydraulic fluid used to open or close the clutch with a pressure signal may flow through the passage to the clutch line. The hydraulic fluid is transported from the clutch line to the clutch actuator. Flow of hydraulic fluid of a first pressure to actuate the clutch may therein actuate the valve to open. Likewise, a flow of hydraulic fluid of a second pressure smaller than the first pressure and too small to actuate the clutch, may actuate the valve to open. The opening of the valve may flow lubricant to the clutch for lubrication and increase pressure to a second counter-pressure chamber of the clutch to an activation pressure. The activation pressure may prevent the clutch from self-closing, such as from hydraulic load at higher speeds, by resisting force from pressure in an actuation chamber of the clutch actuator.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
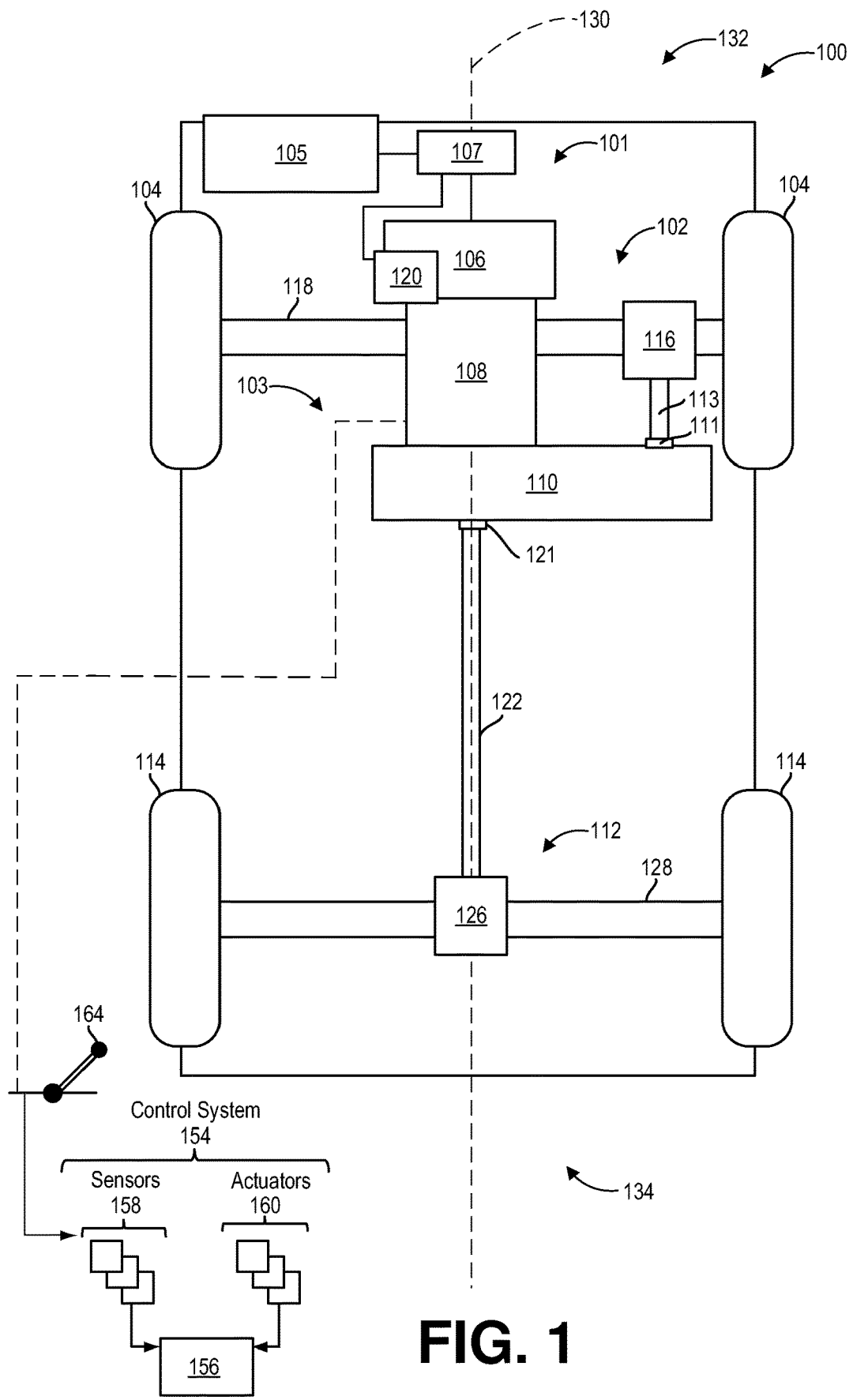
FIG. 1 shows an example schematic of a vehicle which may include the transmission of the present disclosure.

The following description relates to a transmission system with a hydraulic actuation system and a lubrication system for a wet clutch of the transmission. The lubrication system includes a lubrication valve housed by a volume that houses lubricant, where lubrication valve is selectively coupled to a selective lubrication line, where at different states the lubrication valve may fluidically couple or fluidically seal a volume to the selective lubrication line. A clutch control valve is fluidically coupled to a clutch line selectively, such that the clutch control valve may open to fluidically couple or close to fluidically seal to the clutch line. Fluidically and fluidly may be used interchangeably, herein. The lubrication system also includes a main lubrication line and other lubrication lines, such as the volume that houses the lubrication valve. The main lubrication line may supply a continuous flow and pressure of lubricant to the clutch. The selective lubrication line may be selectively opened via the lubrication valve to flow lubricant to the clutch. The hydraulic actuation system for the clutch also includes the clutch control valve, the clutch line, a clutch actuator, and a counter-pressure chamber of the wet clutch, where the clutch line is in fluidic communication with the clutch actuator. The clutch may be driven via a drive component. The drive component may be or rigidly couple to an input of the clutch. The drive component may house components of lubrication system, such as the main lubrication line, the selective lubrication line, and the lubrication valve. The drive component may house components of the actuation system, such as the clutch line and the clutch control valve. The counter-pressure chamber is in fluidic communication with the selective lubrication line and the main lubrication line. The clutch actuator may include and be actuated via an actuation chamber, where the actuation chamber may be in fluidic communication with the clutch line. Pressure from the actuation chamber may press on and advance an actuator component of the clutch actuator. The actuator component may be a piston. Resistive forces from the counter-pressure chamber may resist the advancement of the actuator component, such as via forces from a spring and pressure from lubricant housed via the counter-pressure chamber. When fluid flows via the selective fluid line and the main fluid line to the wet clutch, pressure in the counter-pressure chamber may increase to an activation pressure. The activation pressure may prevent the clutch from self-closing, such as due to hydraulic load at higher rotational speeds. Higher rotational speeds may be speeds greater than or equal to 12,000 rotations per minute (RPM). To close the clutch via the clutch actuator, a pressure of the actuation chamber may be raised greater than the activation pressure. The wet clutch may be a multi-disc wet clutch including a plurality of friction plates and separator plates.

The following description also relates to a method to operate the lubrication system based on temperature and/or speed of the drive component. The method may select between opening and closing the lubrication valve to the selective lubrication line. The method may select between carrying out a first method or a second method to operate a gear shift via the transmission, the wet clutch, and the lubrication valve via the lubrication system. The first method is a standard control routine to open and close the wet clutch via the clutch control valve, while flowing lubricant via the main lubrication line. The second method is a pre and/or post cooling control routine to apply increased cooling and an activation pressure to the wet clutch before opening the wet clutch in a pre-cooling phase or closing the wet clutch in a post-cooling phase via the clutch control valve. During the pre and/or post cooling control routine, lubricant may be flowed to the wet clutch via the main lubrication line and the selective lubrication line. The method may open the lubrication valve to flow lubricant to the selective lubrication line when the temperature of the wet clutch increase above a first threshold of temperature. The method may open the lubrication valve to flow lubricant to the selective lubrication line when the rotational speed of the drive component or the rotational speed across the clutch rises above a second threshold of speed.

Figure 2A:
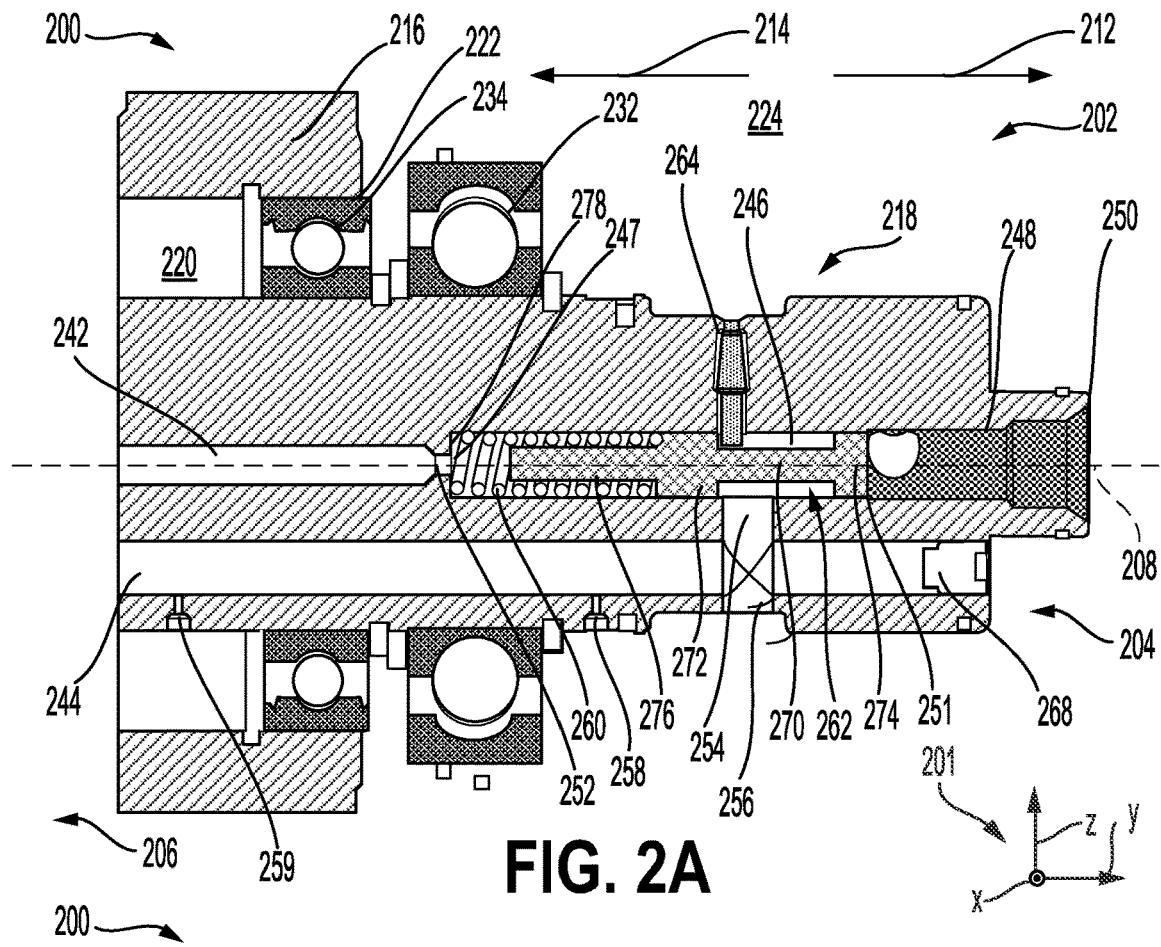
FIG. 2A shows a sectional view of a clutch assembly and shaft where a valve of the present disclosure is closed.
Figure 2B:
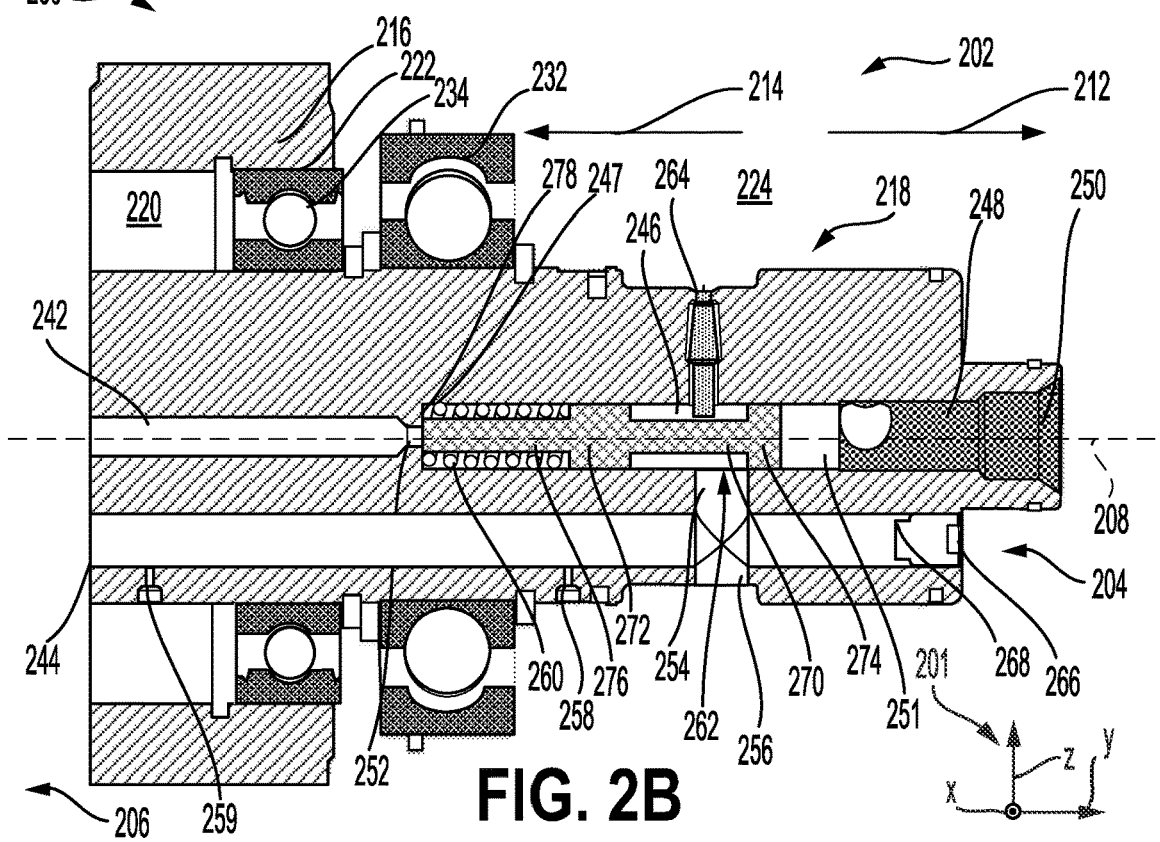
FIG. 2B shows the sectional view of the clutch assembly and shaft where the valve of the present disclosure is open.
Figure 3A:
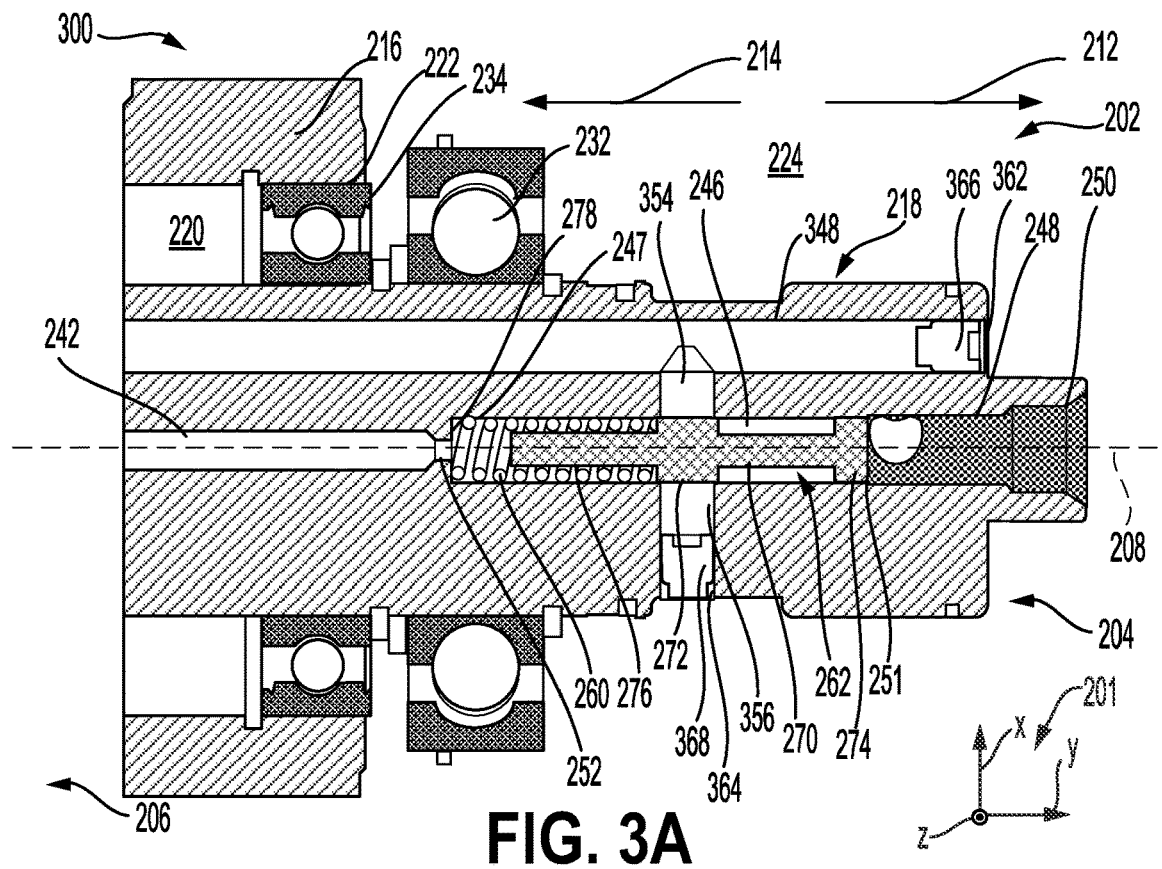
FIG. 3A shows a sectional view of the clutch assembly and the shaft where the valve of the present disclosure is closed to a selective lubrication line.
Figure 3B:
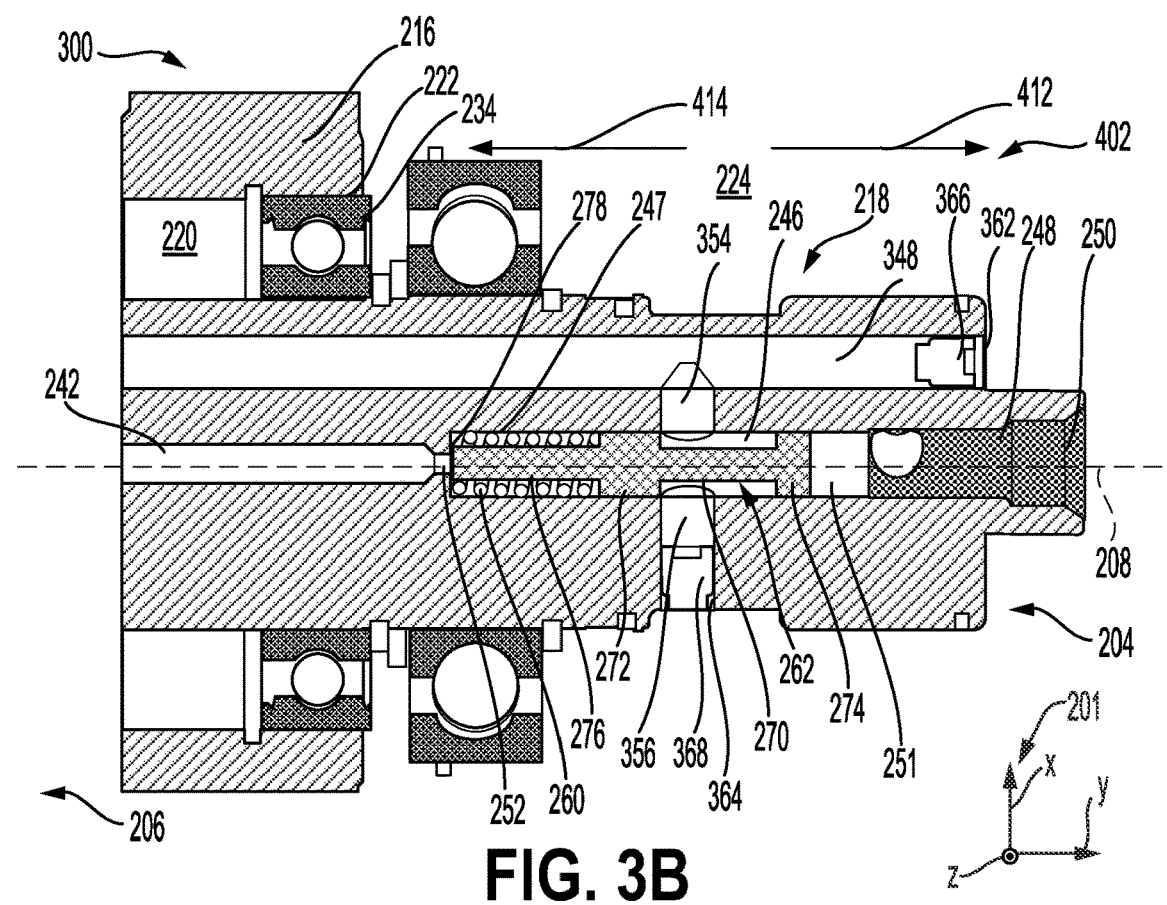
FIG. 3B shows a sectional view of the clutch assembly and the shaft where the valve of the present disclosure is open to the selective lubrication line.
Figure 4A:
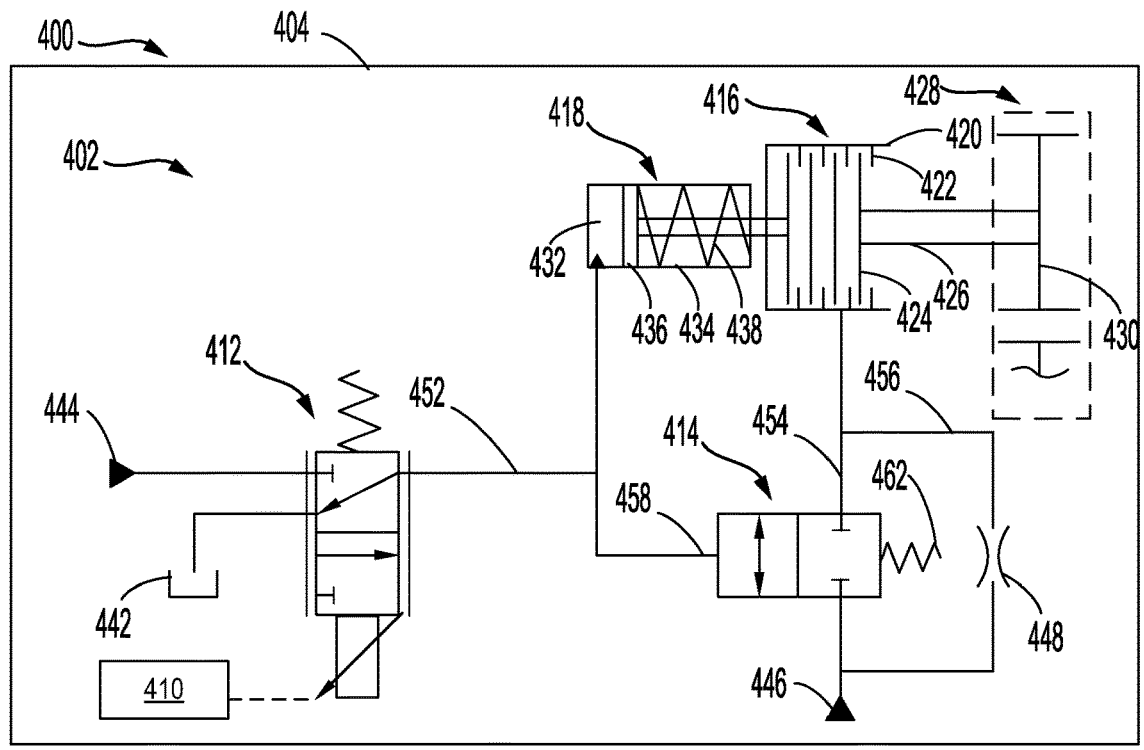
FIG. 4A shows a schematic of a hydraulic circuit diagram of a clutch for a transmission where the clutch is open.
Figure 4B:
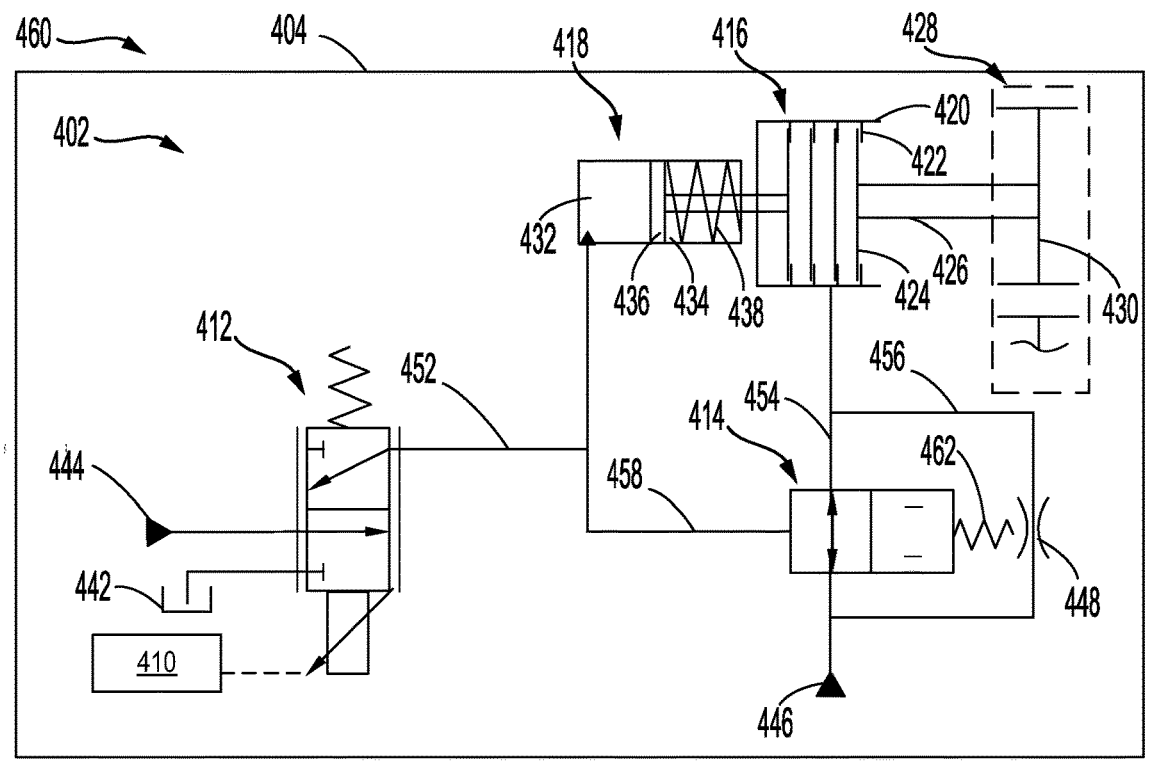
FIG. 4B shows a schematic of the hydraulic circuit diagram of the clutch for the transmission where the clutch is closed.
Figure 5:
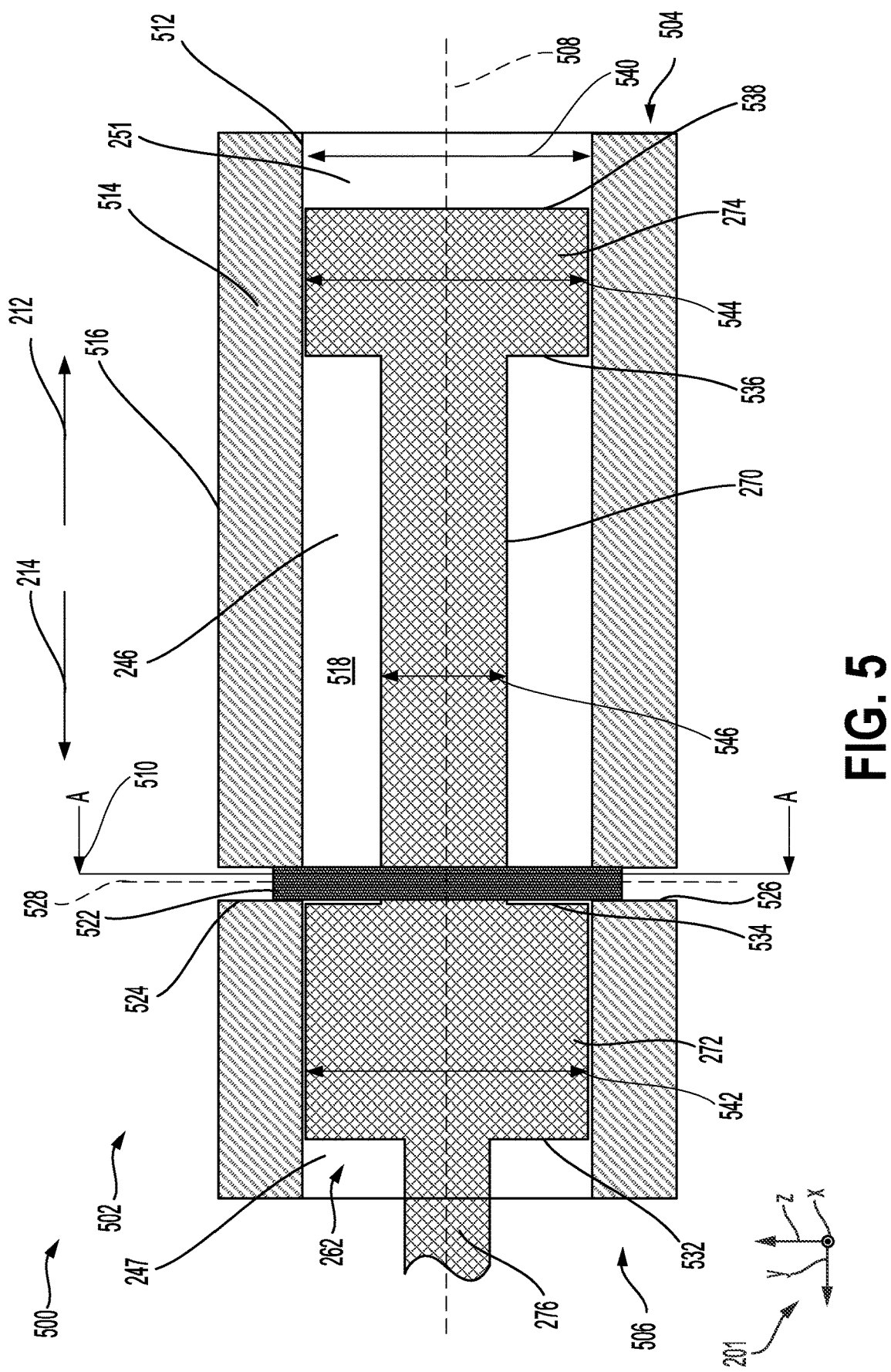
FIG. 5 shows a sectional view of the valve of the present disclosure.
Figure 6:
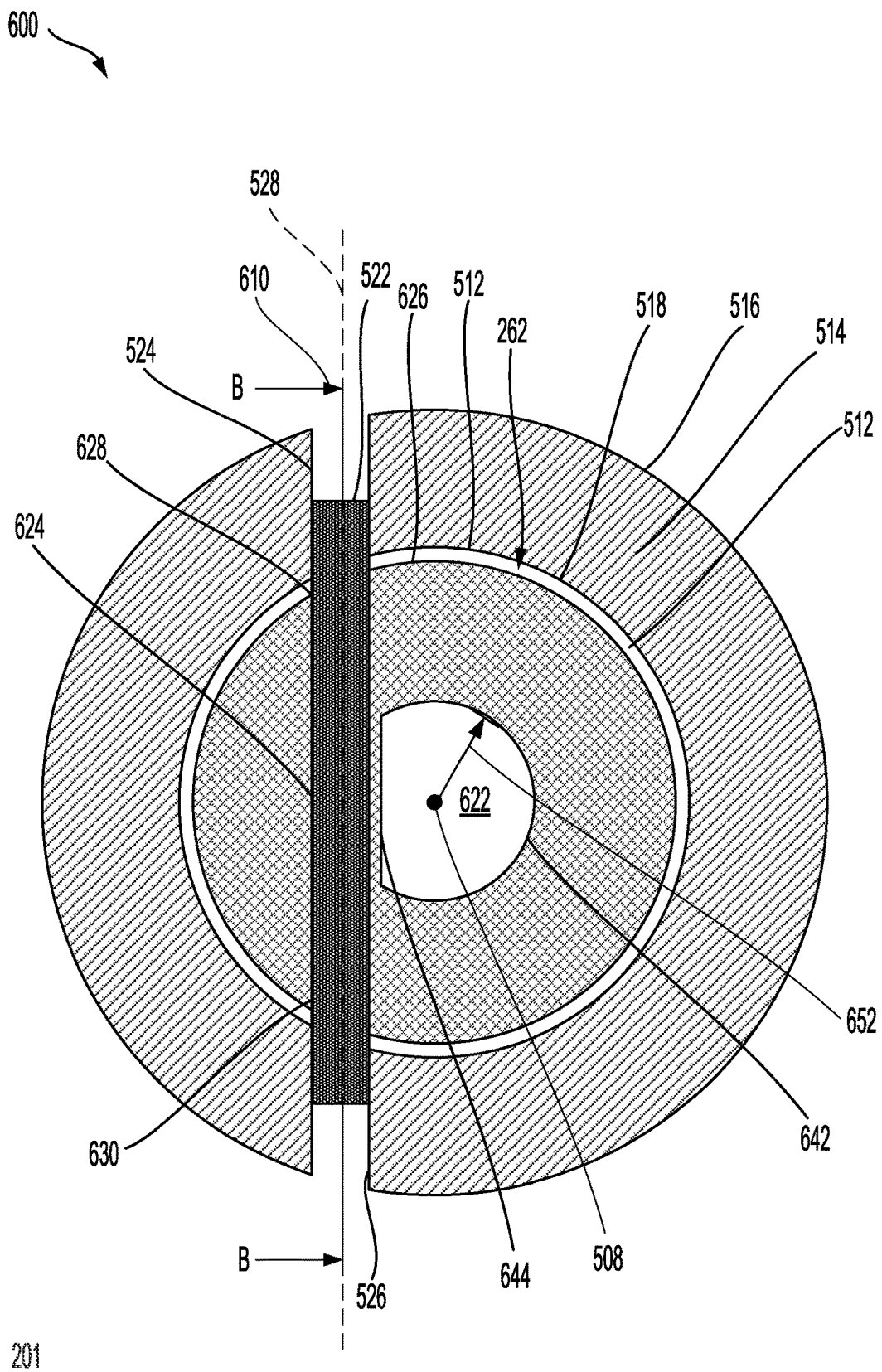
FIG. 6 shows a sectional view of the valve of the present disclosure.
Figure 7:
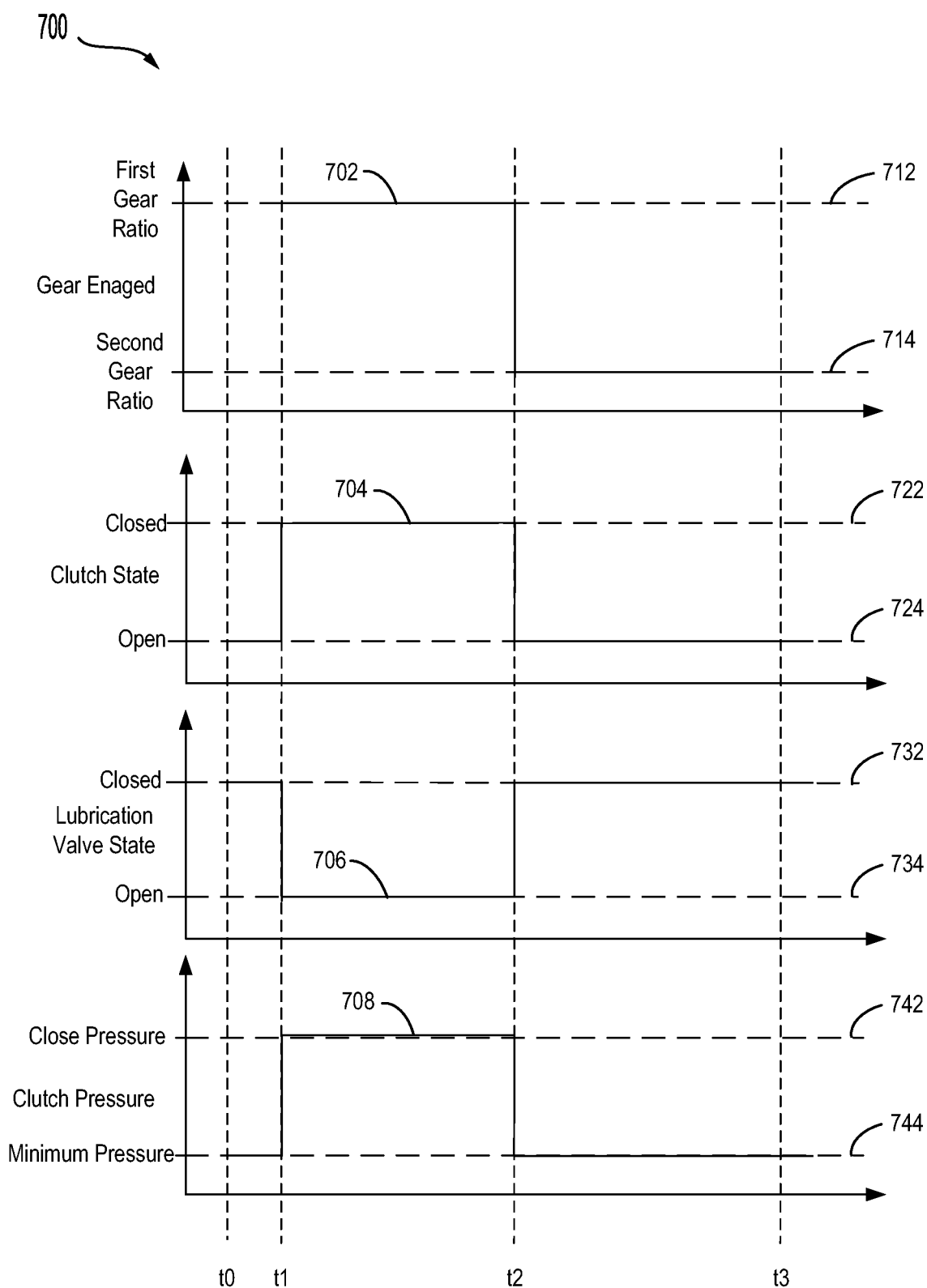
FIG. 7 shows a plurality of timing diagrams for a standard control routine of closing and opening a clutch.
Figure 8:
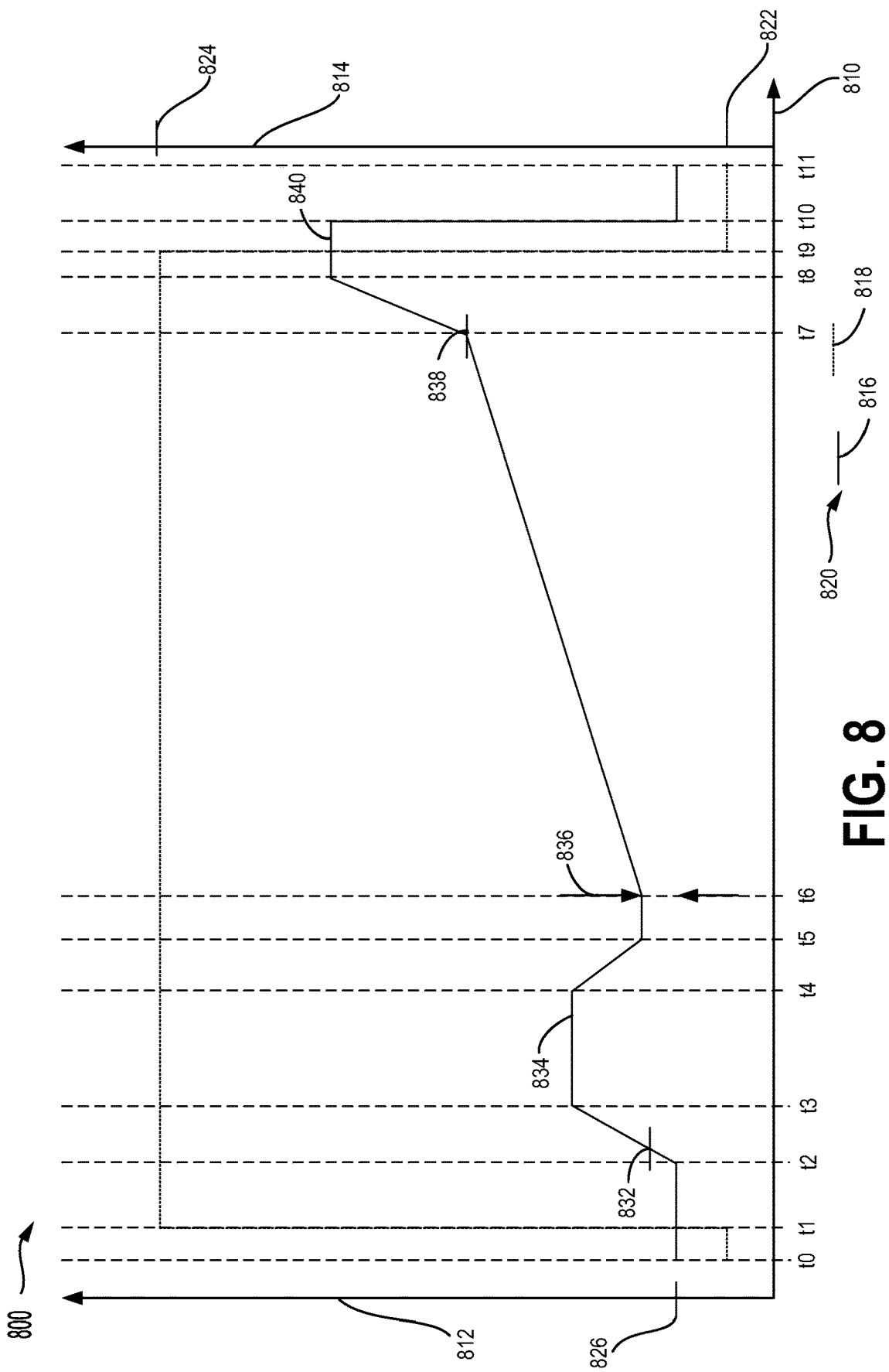
FIG. 8 shows a plot of a current and pressure controlled in the clutch over time.
Figure 9:
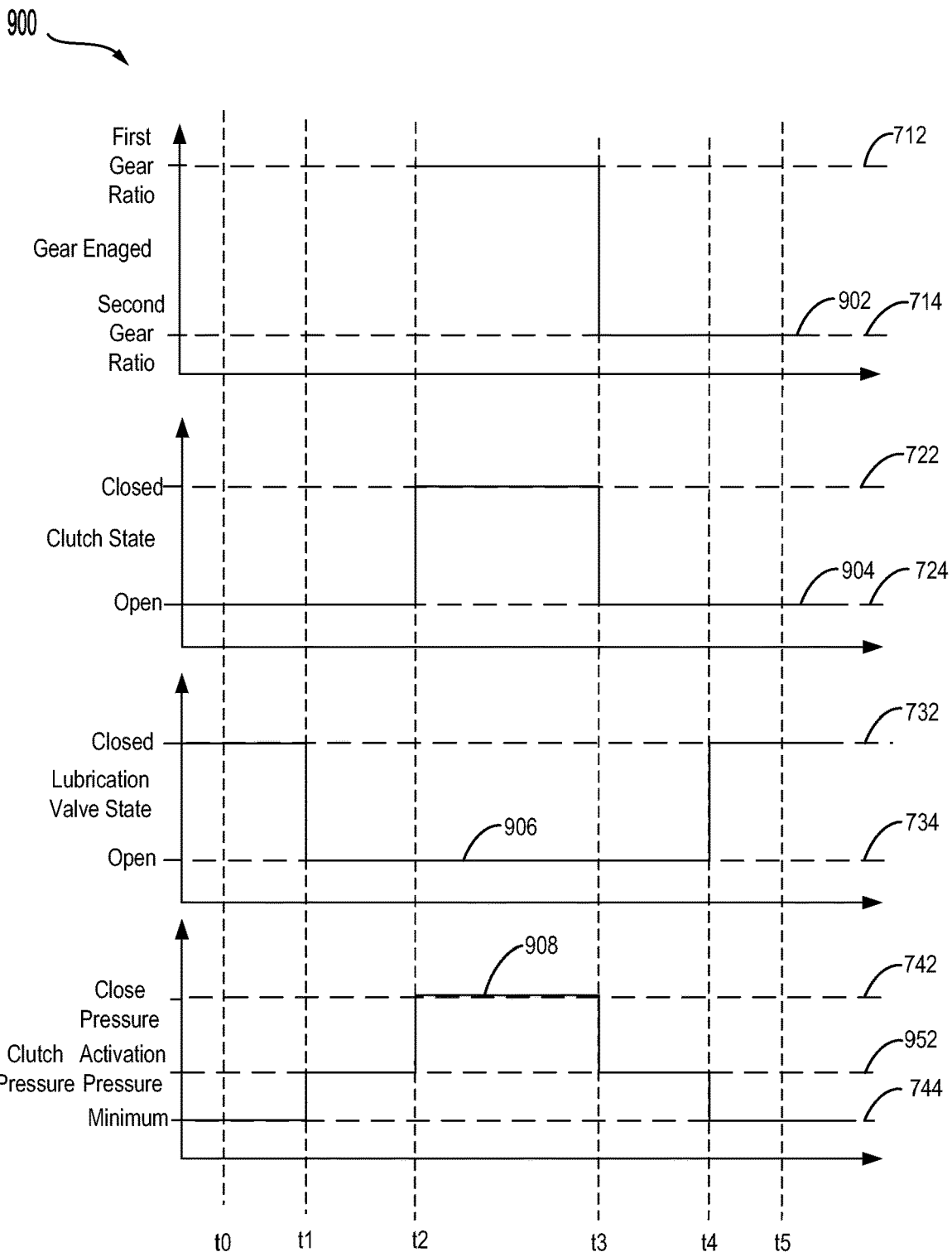
FIG. 9 shows a plurality of timing diagrams for a pre and/or post cooling routine for the clutch.
Figure 10:
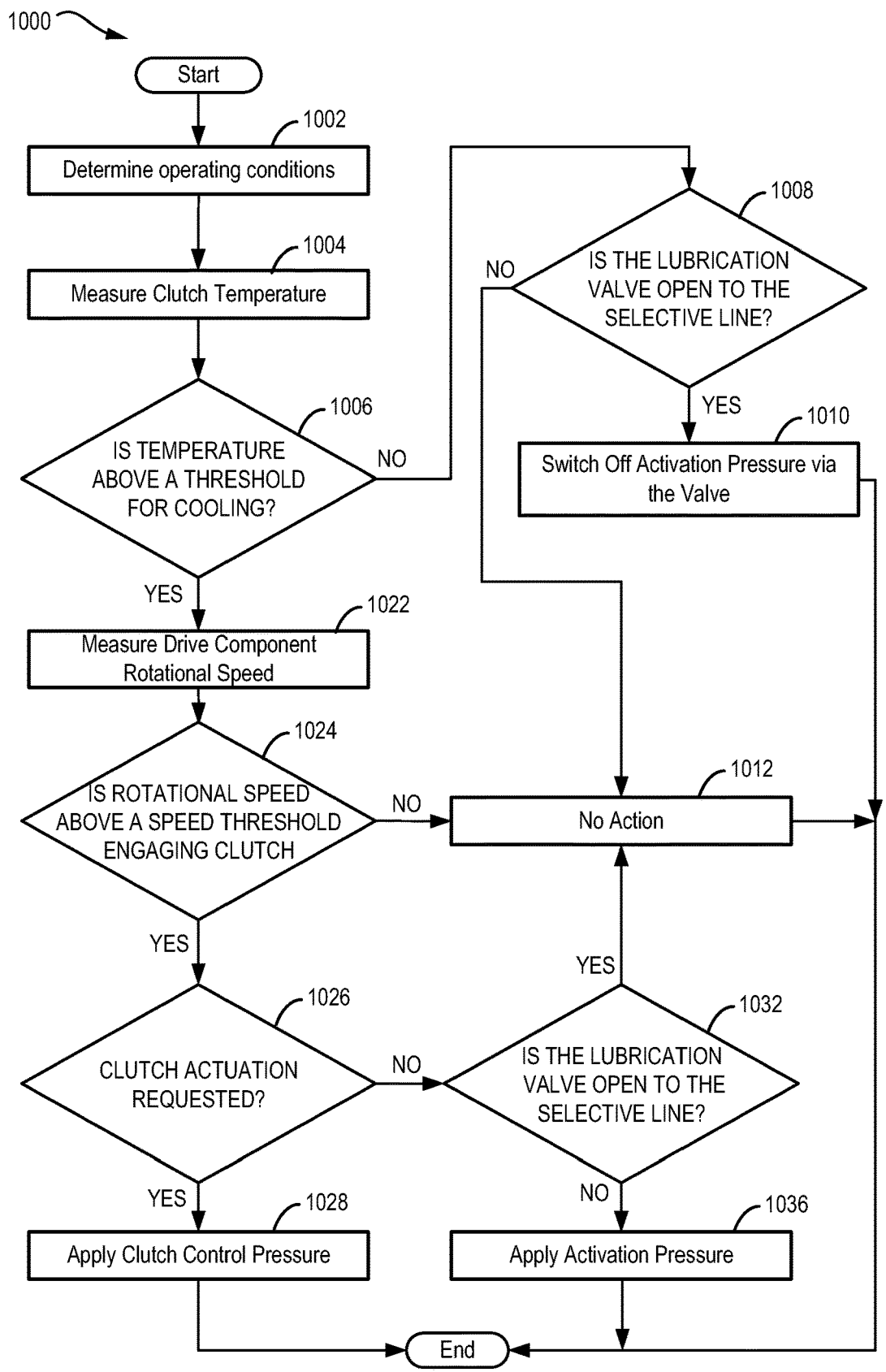
FIG. 10 shows a method of selecting between normal and pre and/or post cooling routines for the clutch.

FIG. 1 shows an example schematic of a vehicle which may include the transmission of the present disclosure. The vehicle in FIG. 1 may be an electrified vehicle such as an EV or a hybrid vehicle with multiple sources of torque that may include an electric machine. FIG. 2A shows a sectional view of a clutch assembly and shaft where a valve of the present disclosure is closed. FIG. 2B shows the sectional view of the clutch assembly and shaft where the valve of the present disclosure is open. FIG. 3A shows a sectional view of the clutch assembly and the shaft where the valve of the present disclosure is closed to a selective lubrication line. FIG. 3B shows a sectional view of the clutch assembly and the shaft where the valve of the present disclosure is open to the selective lubrication line. The sectional view in FIGS. 3A-3B may be taken on a plane 90 degrees from the sectional view of FIGS. 2A-2B. FIG. 4A shows a schematic of a hydraulic circuit diagram of a clutch for a transmission where the clutch is open. FIG. 4B shows a schematic of the hydraulic circuit diagram of the clutch for the transmission where the clutch is closed. FIG. 5 shows a sectional view of the valve of the present disclosure. FIG. 6 shows a sectional view of the valve of the present disclosure. FIG. 7 shows a plurality of timing diagrams for a standard control routine of closing and opening a clutch. FIG. 8 shows a plot of a current and pressure controlled in the clutch over time. FIG. 9 shows a plurality of timing diagrams for a pre and/or post cooling routine for the clutch. FIG. 10 shows a method of selecting between normal and pre and/or post cooling routines for the clutch.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 and FIGS. 4A-4B show schematics of an example configuration with relative positioning of the various components. FIGS. 2A-3B and FIGS. 5-6 show example configurations with approximate position. FIGS. 2A-3B and FIGS. 5-6 are shown approximately to scale; though other relative dimensions may be used. As used herein, the terms "approximately" is construed to mean plus or minus five percent of the range unless otherwise specified. As used herein, the terms "substantially" is construed to mean greater or less than by a factor of two when comparing a component/feature to one or more other components/features.

Further, FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108.

The vehicle 100 may be a light, medium, or heavy duty vehicle. The vehicle 100 may be an on-highway vehicle, a passenger vehicle, including a passenger car, a commercial vehicle that is an on-highway vehicle, a semi-trailer truck, and/or a sports utility vehicle. The vehicle may be an off-highway vehicle or a vehicle with on-highway and off-highway capabilities, such as a construction vehicle, an agricultural vehicle, a sports utility vehicle, and/or a commercial vehicle that is an off-highway vehicle. For an example embodiment, the vehicle 100 may be a wheeled vehicle, such as an automobile. Additionally or alternatively, the vehicle 100 and/or one or more of its components, such as components of the powertrain 101 and/or drivetrain 103, may be used in industrial, locomotive, military, agricultural, and/or aerospace applications. Additionally or alternatively, the vehicle 100 may be a plane, a boat, or other vehicle system that utilizes lubricant.

In one example, the vehicle 100 is an all-electric vehicle or a vehicle with all-electric modes of operation, such as a plug-in hybrid vehicle. The prime mover 106 may be an electric machine, such as an electric motor or an electric motor/generator. Additionally, there may be other movers in the vehicle besides prime mover 106, such as if the vehicle 100 is a hybrid vehicle.

The transmission 108 may be any type of transmission, such as a manual transmission, an automatic transmission, or a continuously variable transmission. Additionally, the transmission 108 may be a gearbox, an axle, or a trans axle. The transmission 108 receives the rotary power produced by the prime mover 106 as an input and outputs rotary power to the drivetrain 103 in accordance with a selected gear or setting. If the vehicle 100 is a hybrid vehicle, wherein there are multiple torque inputs to the transmission 108, with at least an input from a mover besides the prime mover 106. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a forward wheel drive (FWD) in some capacity to vehicle 100, as part of rotary power transferred via the first driveshaft 113. Likewise, the second differential 126 may supply a rear wheel drive (RWD) to vehicle 100, as part of the rotary power transferred via the second driveshaft 122. The first differential 116 and the second differential 126 may supply a FWD and RWD, respectively, as part of an all-wheel drive (AWD) mode for vehicle 100.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the first and second set of wheels 104, 114, etc. The sensors 158 may detect the engagement of input devices 164. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. Vehicle braking may be directly proportional to accelerator pedal position, for example, degree of depression. For another example, controller 156 may receive an indication of depression of the accelerator pedal, signaling a desire for increased vehicle speed. Vehicle acceleration may be directly proportional to accelerator pedal position, for example, degree of depression. In response, the controller 156 may command operations, such as shifting gear modes of the transmission 108. Alternatively, the gear modes of the transmission 108 may be shifted manually, such as if the transmission 108 is a manual transmission. The vehicle 100 may include one or more input devices 164. The input devices 164 may be a shifting device that may input a command signal, such as a shift command, to change the state of the gear ratio selected via the transmission 108. A shifting device of the input devices 164 may include an automatic gear shifter or a manual gear shifter. The input devices 164 may be in communication and send command signals to the controller 156 and control system 154, such as via the sensors 158, and the actuators 160 may shift gears based on the signal. Additionally or alternatively, the input devices 164 may selectively couple and shiftingly couple to the gearsets of the transmission 108, such as to manually shift the transmission between gear sets.

In some examples, additionally or alternatively, the vehicle 100 may be a hybrid vehicle with multiple sources of torque, such as from both an engine, such as an internal combustion engine (ICE), and an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine. For these examples, the prime mover 106 may be an engine and a second mover 120 may be an electric machine. The second mover 120 may receive power from energy storage device 105 and may be electrically coupled to the inverter 107.

In some embodiments, additionally or alternatively, the transmission 108 may be a first transmission, further comprising a second transmission arranged on the second set of axle shafts 128. The transmission 108 may be a gearbox. Alternatively, the transmission 108 may be an axle transmission or a trans axle transmission.

A set of reference axes 201 are provided for comparison between views shown in FIGS. 2A-3A and FIGS. 5-6. The reference axes 201 indicate an x-axis, a y-axis, and a z-axis. The x-axis may be a lateral axis, the y-axis may be a longitudinal axis, and the z-axis may be a vertical axis. In one example, the z-axis may be parallel with a direction of gravity, and the x-y plane may be parallel with a horizontal plane that a clutch assembly 202 may rest upon. When referencing direction, positive may refer to in the direction of the arrow of the y-axis, x-axis, and z-axis and negative may refer to in the opposite direction of the arrow of the y-axis, x-axis, and z-axis. A circle may represent an axis of the reference axes 201 that is normal to a view. A filled circle may represent an arrow and axis facing toward, or positive to, a view. An unfilled circle may represent an arrow and an axis facing away, or negative to, a view.

Turning to FIGS. 2A-2B, a first view 200 is shown of a clutch assembly 202. The first view 200 is a sectional view, where the first view 200 may be taken on a plane that includes an axis 208, where the plane is parallel with a plane formed between the y-axis and z-axis of the reference axes 201. The clutch assembly 202 may be centered on the axis 208, such that the clutch assembly 202 is positioned around the axis 208. The axis 208 may therein be a central axis for the clutch assembly 202. Likewise, the axis 208 is a longitudinal axis for the assembly and may be a rotational axis for the rotational elements of the clutch assembly 202. The clutch assembly 202 may have a first side 204 and a second side 206, where the first side 204 is opposite to the second side 206. The second side 206 may be outside of the first view 200. The clutch assembly 202 includes a valve 262, where the valve 262 may be a spool type valve (e.g., of a spool configuration). The valve 262 may selectively open or close to let fluid flow to a fluid passage that may transport fluid through the clutch assembly 202, e.g., a selective lubrication line. FIG. 2A shows a portion of a clutch assembly 202 from the first view 200 when the valve 262 is in a closed position. FIG. 2B shows the portion of the clutch assembly 202 from the first view 200 when the valve 262 is in an open position.

The valve 262 may be shifted in a first direction 212 or a second direction 214 to open or close, where the first direction 212 is opposite to the second direction 214. The first direction 212 and the second direction 214 may be parallel with the axis 208. For an example, the valve 262 may shift in the first direction 212 to close, and the valve may shift in the second direction 214 to open. When shifted in the first direction 212, the valve 262 is positioned closer to the first side 204 from a starting position. When shifted in the second direction 214, the valve is positioned closer to the second side 206 from a starting position.

The clutch assembly 202 may include a clutch component 216 and a gear component 218. The clutch assembly 202 also includes a clutch, where the clutch is a wet clutch. The clutch may comprise or have components rigidly coupled to the clutch component 216. The gear component 216 may be a driven component that may be driven via the drive component 218, such as when the clutch is closed. The gear component 216 includes a gear that may mesh and drivingly couple with other gears or rotational elements. The clutch assembly 202 may be surrounded by an exterior 224, where the exterior 224 may be a volume, such as packing space. The drive component 218 may be a rotational element, such as a shaft. The drive component 218 may drive the clutch of the clutch assembly 202. The gear component 216 may have a cavity 220 and a passage 222. The cavity 220 may receive the drive component 218 via the passage 222. The drive component 218 may be supported via a first bearing assembly 232 and a second bearing assembly 234. The first bearing assembly 232 and the second bearing assembly 234 may be positioned around, such as radially around, and in surface contact with the drive component 218. The first bearing assembly 232 and the second bearing assembly 234 may include and inner race, an outer race, and a single or a plurality of bearings. For example, the first bearing assembly 232 and the second bearing assembly 234 may include a plurality of bearings, such as ball bearings. The second bearing assembly 234 may be between, such as radially between, the passage 222. The first bearing assembly 232 may be between, such as radially between, a fixed feature and the drive component 218, where fixed feature may be a fixed feature of a transmission that includes the clutch assembly 202, such as a housing of the transmission. The second bearing assembly 234 may allow the drive component to rotate freely of the gear component 216.

The drive component 218 may include a plurality of fluid passages and other fluid volumes that may house and transport fluid such as work fluid and lubricant/coolant. The drive component 218 may include a first fluid passage 242 and a second fluid passage 244. The first fluid passage 242 may be an actuation line that supplies work fluid to the clutch of the clutch assembly 202 to actuate the clutch. For example, the first fluid passage 242 may supply work fluid and increase pressure to an actuation chamber to advance an actuator of the clutch in a direction to contact and compress the clutch pack of the clutch. The second fluid passage 244 may be a first lubrication line that may supply lubricant to a clutch. The second fluid passage 244 may be a main lubrication line, supplying a constant volumetric flow to the clutch. The second fluid passage 244 may deliver lubricant to components of the clutch, such as the clutch pack, for lubrication and cooling. Additionally, the second fluid passage 244 may deliver lubricant to a counter-pressure chamber of the clutch to prevent self-closing of the clutch.

The drive component 218 may also include a first chamber 246, a second chamber 247, and a third chamber 251. The first chamber 246, the second chamber 247, and the third chamber 251 may be formed from a common volume, such as a fluid passage or a fluid cavity, that may house the valve 262. The valve 262 may divide the common volume into the first chamber 246, the second chamber 247, and the third chamber 251. The common volume may be a part of another fluid line, such as a lubrication line fluidically coupled to and separate from the fluid source and the second fluid passage 244. The first chamber 246, the second chamber 247, and the third chamber 251 may have surfaces continuous with one another. The drive component 218 may include a port 248 with a first opening 250. The port 248 may be in fluidic communication and fluidly couple to the valve 262. The first opening 250 may be on the first side 204 and may fluidly couple to a source of fluid, such as lubricant. The port 248 may be housed in a common volume that includes the first chamber 246, the second chamber 247, and the third chamber 251. The first fluid passage 242, the first chamber 246, the second chamber 247, the port 248, and the first opening 250 may be centered on the axis 208, such as to be radially about the axis 208. The second fluid passage 244 may have a centerline and a length parallel with the axis 208. The second chamber 247 may be sandwiched between the first fluid passage 242 and the valve 262. The first chamber 246 may be sandwiched between opposite ends of the valve 262. The third chamber 251 may be sandwiched between the valve 262 and the port 248. When the valve 262 is in a closed position, such as in FIG. 2A, the valve 262 may abut the port 248, and third chamber 251 may be at the interface between the valve 262 and the port 248.

The first fluid passage 242 and the second chamber 247 may be fluidly coupled, such as to be in fluidic communication, via a first channel 252. The first channel 252 may be sandwiched between the first fluid passage 242 and the second chamber 247. The first channel 252 may be centered on the axis 208, such as radially around the axis 208. The second chamber 247 may house a spring 260. The spring 260 may be sandwiched between a surface 278 of the second chamber 247 and the valve 262. The second fluid passage 244 may be in fluidic communication with the first chamber 246 via a second channel 254. An insert 264 may extend into the first chamber 246. The insert 264 may abut the valve 262. The insert 264 may be a stopper and may prevent movement of the valve 262, such as when the valve 262 abuts the insert 264.

Fluid in the first chamber 246 may be fluidly separated and sealed from the second chamber 247 via features of the valve 262. Likewise, fluid from the third chamber 251 and the port 248 may be fluidly separated and sealed from the first chamber 246 via features of the valve 262. The valve 262 may also be hollow, such as to include at least a passage that may fluidly couple the second chamber 247 to the third chamber 251. Increasing flowrate and pressure to the third chamber 251, such as a via the port 248, may place force on the valve 262 and advance the valve in the second direction 214. Increasing flowrate and pressure to the third chamber 251 may therein increase the flowrate and pressure to the second chamber 247, where the increased flowrate and pressure to the second chamber 247 may increase flowrate and pressure to the first fluid passage 242.

The third chamber 251 may be an actuation chamber for the valve 262, where the valve 262 may be actuated open or closed via force from changes in pressure to the third chamber 251, such as via pressure from the port 248. The first chamber 246 may be a lubricant flow chamber via which lubricant may flow from the second fluid passage 244 to other passages and volume of drive component 218. The second chamber 247 may be a counter-pressure chamber for the valve 262, where force from pressure of fluid and a spring force of the spring 260 may resist force from the valve 262 in the second direction. It should be appreciated, that the third chamber 251 is a separate actuation chamber from the actuation chamber that may actuate the clutch, described above. Likewise, the second chamber 247 is a separate counter-pressure chamber than the counter-pressure chamber that may apply resistive force to clutch, described above.

The second fluid passage 244 may include a plurality of openings such as a second opening 256 and a third opening 266. The second opening 256 may fluidly couple to the exterior 224. The second opening 256 may be in fluidic communication with the second channel 254. The second fluid passage 244 may be a blind hole that may be plugged. For example, a third opening 266 of the second fluid passage 244 may be plugged via a plug 268. The second fluid passage 244 may also include one or more of a plurality of third channels 258 and one or more of a plurality of fourth channels 259. The third channels 258 and the fourth channels 259 may be radial channels, extending in a radially direction from the center of the shaft (e.g., the axis 208). The third channels 258 may be in fluidic communication with the exterior 224. The fourth channels 259 may be in fluidic communication with the cavity 220. For an example, the third channels 258 and/or the fourth channels 259 may be feed holes for consumers of lubricant, such as bearings. For another example, the third channels 258 and/or the fourth channels 259 may be bleed holes.

The valve 262 may include a core 270, a first land 272, a second land 274, and an appendage 276. The core 270 may connect and be sandwiched between the first land 272 and the second land 274. The core 270 may be a stem. The first land 272 may be a first piston and the second land 274 may be a second piston. The appendage 276 may extend from the first land 272, such as in the first direction 212 from the first land 272. The appendage and/or first land 272 may be closest to and include a first end of the valve 262. The second land 274 may include and be closest to a second end of the valve 262. The first end of the valve 262 is opposite the second end of the valve 262. The appendage 276 may be received and housed by the second chamber 247. The spring 260 may be positioned around the appendage 276, such as radially around the appendage 276. The first land 272 may fluidly seal and separate the second chamber 247 from the first chamber 246. The second land 274 may fluidly seal and separate the first chamber 246 from the third chamber 251. Force of pressure and spring force from the spring 260 in the second chamber 247 may press on the first land 272 in the first direction 212. Force of pressure in the first chamber 246 may press on the first land 272 in the second direction 214 and the second land 274 in the first direction 212. Force of pressure in the third chamber 251 may press on the second land 274 in the second direction 214. The first land 272 may abut the insert 264, such as when the valve 262 is in a closed position in FIG. 2A. The first land 272 may prevent the valve 262 from moving further in the first direction 212, such as when the valve 262 abuts the first land 272.

In FIG. 2B, the valve 262 is shifted to an open position. The valve 262 is shifted in the second direction 214 from the closed position in FIG. 2B. In the open position, the spring 260 and the second chamber 247 are compressed. Likewise, the third chamber 251 is expanded. The first land 272 may not be in surface sharing contact with the insert 264. The appendage 276 may abut the surface 278 and fluidly seal against the first channel 252. A passage that extends through the valve 262 may fluidly couple the first channel 252 via the appendage 276.

Turning to FIGS. 3A-3B, a second view 300 is shown of the clutch assembly 202. The second view 300 is a sectional view, where the second view 300 may be taken on a plane that includes an axis 208. The second view 300 may be taken on a view plane 90 degrees from the view plane of the first view 200 of FIGS. 2A-2B. The view plane of the second view 300 may be parallel with a plane formed between the x-axis and y-axis of the reference axes 201. FIG. 3A shows a portion of a clutch assembly 202 from the second view 300 when the valve 262 is in a closed position. In the closed position, the valve 262 may close to a selective lubrication line, such that the selective lubrication line may not receive and transport a flow of fluid, such as lubricant. FIG. 3B shows the portion of the clutch assembly 202 from the second view 300 when the valve 262 is in an open position. In the open position the valve 262 may open to the selective lubrication line, such that the selective lubrication line may receive and transport a flow of fluid. The valve 262 may therein place the lubricant source in selective fluidic communication with the selective lubrication line.

The drive component 218 may have a third fluid passage 348. The third fluid passage 348 may be the selective lubrication line, where fluid may be selectively supplied to a clutch of the clutch assembly 202. The third fluid passage 348 may deliver lubricant to components of the clutch, such as the clutch pack, for lubrication and cooling. Additionally, the third fluid passage 348 may deliver lubricant to a counter-pressure chamber of the clutch to prevent self-closing of the clutch.

The common volume for the first chamber 246, the second chamber 247, and the third chamber 251 may have a plurality of tributaries, such as a fifth channel 354 and a sixth channel 356. The fifth channel 354 may fluidly couple the first chamber 246 to the third fluid passage 348. The first land 272 may block and fluidly seal the fifth channel 354 from the first chamber 246, such as when the valve 262 is in a closed position. Likewise, the first land 272 may block and fluidly seal the sixth channel 356 from the first chamber 246.

The third fluid passage 348 may be a blind hole that may be plugged. For example, a fourth opening 362 of the third fluid passage 348 may be plugged and fluidly sealed via a second plug 366. Likewise, the sixth channel 356 may be a blind hole that may be plugged. For example, a fifth opening 364 of the sixth channel 356 may be fluidly sealed by via a third plug 368.

In FIG. 3B, where the valve 262 is in an open position, the first land 272 may not block and fluidly seal the fifth channel 354 or the sixth channel 356. When the valve 262 is in the open position, fluid may flow from the first chamber 246 to the third fluid passage 348 via the fifth channel 354.

Turning to FIG. 4A, shows a hydraulic circuit diagram 402 for a hydraulic system of a transmission 404 in a first state 400. The first state 400 is an open state, where a clutch assembly 416 of the hydraulic system is open. FIG. 4B, shows the hydraulic circuit diagram 402 of the hydraulic system in a second state 460. The second state 460 is a closed state, where the clutch assembly 416 of the hydraulic system is closed. The clutch assembly 416 includes a clutch. When the clutch assembly 416 is open, the clutch is open. When the clutch assembly 416 is closed, the clutch is closed. When open in the first state, torque may not be transferred across the clutch assembly 416, such as between an input and an output of the clutch assembly 416. When closed in the second state 460, the clutch assembly 416 may rotationally couple the input and the output of the clutch assembly 416. When the clutch assembly 416 is closed, the clutch assembly 416 may engage a gearset or another reduction set to enable a power flow across the clutch assembly 416 and through the reduction set. Components of FIGS. 4A-4B and differences between the first state 400 and the second state 460 may be referred to collectively, herein. The first state 400 may be referred to herein as the open state 400, herein. Likewise, the second state 460 may be referred to herein as the closed state 460, herein. The opening and closing of the clutch assembly 416 and transitioning between the open state 400 and the closed state 460, may be controlled via commands from a controller 410. The controller 410 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. The controller 410 may be controller 156 of FIG. 1 and/or be part of a larger control system, such as control system 154 of FIG. 1.

The clutch assembly 416 may be a part of a transmission system of a transmission 404. The transmission 404 may be a transmission of a vehicle, such as the transmission 108 of the vehicle 100 of FIG. 1. The clutch assembly 416 may selectively couple to a reduction set of the transmission 404, such a gearset 428. When selectively open in the open state 400, a power flow may not be transferred across the clutch assembly 416 to the gearset 428. Likewise, when selectively closed in the closed state 460, a power flow may be transferred across the clutch assembly to the gearset 428.

Transitioning between the open state 400 and the closed state 460 may be governed by changes to the states of a first valve 412, a second valve 414, and a piston assembly 418. The first valve 412 may be a control valve for the clutch assembly 416 (e.g., a control clutch valve) operable to control the flow of hydraulic/actuation fluid to the piston assembly 418 by allowing or restricting the flow of hydraulic/actuation fluid. The first valve 412 may also be and be referred to as a selector valve/prop valve for the clutch assembly 416, where the first valve 412 may affect gear selection via increasing or decreasing pressure to an actuator, such as the piston assembly 418. The second valve 414 may be a lubrication valve operable to control the flow of lubricant to the clutch assembly 416 and the piston assembly 418 by allowing or restricting the flow of lubricant. The piston assembly 418 may be the clutch actuator that may apply force to and actuate the clutch of the clutch assembly 416 from an open state to a closed state and vice versa. When controlled, first valve 412 and the second valve 414 may control a flow of fluid via opening to start flow or closing to stop flow. The first valve 412 and/or second valve 414 may have a single open state and a single closed state, where the open state may be a fully open state allowing a maximum flowrate of volume through and the closed state may be a fully closed state may allow no volume through. Alternatively, the first valve 412 and/or the second valve 414 may have a plurality of open states, where the sectional areas of the openings of the first valve 412 and/or the second valve 414 vary in sizes between the sectional areas of the fully open and fully closed states. The first valve 412 and/or the second valve 414 partially open to increase the sectional area and the volumetric flow rate from a previous state, or partially close to decrease the sectional area and the volumetric flowrate that from a previous state.

The clutch assembly 416 is a wet clutch that includes a clutch pack 420 with a plurality of friction plates 422 and a plurality of separator plates 424. The friction plates 422 and separator plates 424 are interleaved. In the open state 400 the friction plates 422 and the separator plates 424 may not contact, leaving the clutch assembly 416 open. In the closed state 460 the friction plates 422 and the separator plates 424 may contact, closing the clutch assembly 416. The clutch of the clutch assembly 416 may be a multi-disc wet clutch, where the clutch pack 420 is a multi-disc clutch pack, the friction plates 422 are a plurality of friction discs, and the separator plates 424 are a plurality of separator discs.

The clutch assembly 416 may selectively couple to the gearset 428 via a gear 430 and driven component 426. The clutch assembly 416 may selectively couple to the gearset 428 in the closed state 460. When selectively coupled to the gearset 428, the clutch assembly 416 may drivingly couple to the gearset 428 such as to transfer a power flow to the gearset 428. The rotational energy of the power flow across the clutch assembly 416 and to the gearset 428 may be transferred via torque. The driven component 426 may physically couple or include the output of clutch assembly 416. Engaging the reduction via the clutch assembly 416 may select a gear (e.g., a gear ratio) for a transmission housing the reduction set, such as the transmission 108 of FIG. 1. The clutch assembly 416 may selectively couple and transfer a power flow to a driven component 426. The driven component 426 may rotationally couple and drivingly couple to the gear 430. The gear 430 may be an input gear to the gearset 428.

The piston assembly 418 includes an actuation chamber 432 and a counter-pressure chamber 434, separated via a piston 436. The counter-pressure chamber 434 may house a spring 438. The piston 436 may be the actuation component of the piston assembly 418. Forces from pressure of fluid housed via the actuation chamber 432 may press on and drive the piston 436 toward the clutch assembly 416. The force from fluid in the actuation chamber 432 may be referred to as actuation forces, herein. Resistive forces from pressure of fluid, such as lubricant, housed in the counter-pressure chamber and the spring 438 may press on the piston 436 in the opposite direction of the direction of the actuation forces. The piston 436 may be driven by the actuation forces to press upon the clutch pack 420. The actuation forces may be transferred to the clutch pack 420 to press the friction plates and separator plates into contact, closing the clutch assembly 416. In the open state 400, the piston 436 does not press on the clutch pack 420. In the closed state 460, the piston 436 presses on the clutch pack 420.

In the open state 400, the first valve 412 is controlled to a null flow state and may be open to a reservoir 442. At the null flow state, the first valve 412 is closed to a first pressure source 444 and fluid may not be driven or pressurized through the first valve 412. Fluid may not be driven through the first fluid line 452 and the piston assembly 418 may not be pressurized to actuate the piston 436 toward the clutch pack 420. In the closed state 460, the first valve is controlled to a first open flow state and may be open to a first pressure source 444. At the first open flow state, fluid may be driven via the pressure differential between the first pressure source 444 and the piston assembly 418 through the first valve 412. The first pressure source 444 is a hydraulic/actuation fluid source. The first pressure source 444 may be or be upstream from the output of a pump.

The first valve 412 may fluidly couple to a first fluid line 452, where the first fluid line 452 may transport fluid to the piston assembly 418. The first fluid line 452 may be a clutch line that supplies hydraulic/actuation work fluid to the piston assembly 418, such as the first fluid passage 242 of FIGS. 2A-3B. Fluid may be driven via the first fluid line 452 to piston assembly 418 and may actuate piston 436 toward the clutch pack 420.

In the open state 400, the second valve 414 is controlled to a reduced flow state (e.g., a choke flow) to flow a first smaller volumetric flow to the clutch assembly 416 and the piston assembly 418. In the reduced flow state, the second valve 414 may be closed to a second pressure source 446; however, a fluid line restriction 448 may be open to the second pressure source 446. The fluid line restriction 448 may be a fluid passage and/or fluid channel fluidically coupled to the second pressure source 446, such as a channel open to a pressure source that feeds a main fluid line, such as the second fluid passage 244 of FIGS. 2A-2B. The second pressure source 446 is a lubricant source. The second pressure source 446 may be or be upstream from the output of a pump. In the closed state 460, the second valve 414 is controlled to an open flow state to flow a second larger volumetric flow to the clutch assembly 416 and the piston assembly 418. Likewise, in the closed state 460, the fluid line restriction 448 remains open to the pressure source 446 as in the open state 400. Fluid may be driven via a pressure differential between a first pressure at the second pressure source 446 and a second pressure in the clutch assembly 416 and the piston assembly 418.

The second valve 414 may fluidly couple to a second fluid line 454. The fluid line restriction 448 may fluidly couple to a third fluid line 456. The second and third fluid lines 454, 456 may be lubrication fluid lines that transport and supply lubricant. The third fluid line 456 may be a main lubrication line, such as the second fluid passage 244 of FIGS. 2A-2B. The second fluid line 454 may be a selective lubrication line, such as the third fluid passage 348 of FIGS. 3A-3B. The second fluid line 454 and the third fluid line 456 may transport fluid to the clutch assembly 416 and the piston assembly 418.

A first flow of fluid delivered via the first valve 412 and a second flow of fluid delivered via the second valve 414 and the fluid line restriction 448 may be delivered to opposite sides of the piston 436. Fluid from the first valve 412 may flow to and pressurize the actuation chamber 432 via the first fluid line 452. Fluid from the second valve 414 and the fluid line restriction 448 may flow to and pressurize the counter-pressure chamber 434, via the second fluid line 454 and the third fluid line 456, respectively. Fluid driven via the second and third fluid lines 454, 456 to the piston assembly 418 may resist the actuation forces on the piston 436.

The first valve 412 may be a solenoid valve that may be actuated from open to close via a solenoid. The second valve 414 may be a pressure valve that may be actuated from open to closed via hydraulic actuation. The second valve 414 may be controlled to open to the second pressure source 446, via the opening of the first valve 412 to the first pressure source 444. The second valve 414 may be controlled open via pressure from the first pressure source 444. When open, the first valve 412 may allow the pressure from the first pressure source 444 to open the second valve 414. Work fluid and pressure from the first pressure source 444 may be delivered to open the second valve 414 via a fourth fluid line 458. The fourth fluid line 458 may be a tributary of the first fluid line 452. The first fluid line 452 and the fourth fluid line 458 may fluidically couple at a fluid junction, such as a T-junction. Pressure in the first fluid line 452 and the fourth fluid line 458 may equalize. When the first valve 412 is closed, the pressure in the first fluid line 452 and the fourth fluid line 458 may reduce. The second valve 414 have a spring 462. The spring 462 may apply a spring force to the second valve 414. Below a threshold of pressure from the fourth fluid line 458, the force from pressure placed on the second valve 414 may become less than a spring force of the spring 462. At a pressure force less than the spring force, the spring 462 may expand and return the second valve 414 to being closed to the second pressure source 446. The spring 462 may be the spring 260 of FIGS. 2A-3B.

The hydraulic circuit diagram 402 may be for a clutch lubrication system and clutch actuation system of the clutch assembly 416. The clutch assembly 416 may be a part of a transmission system of transmission 404. The transmission 404 may be a transmission of a vehicle, such as the transmission 108 of the vehicle 100 of FIG. 1. The clutch assembly 416 may selectively couple to a reduction set of the transmission 404, such a gearset 428. When selectively open in the open state 400, a power flow may not be transferred across the clutch assembly 416 to the gearset 428. Likewise, when selectively closed in the second state 460, a power flow may be transferred across the clutch assembly to the gearset 428.

Turning to FIG. 5, a third view 500 is shown of a valve assembly 502 including the valve 262. The third view 500 is a sectional view, where the third view 500 may be taken on a plane that is parallel with a plane formed between the y-axis and z-axis. The valve assembly 502 may be centered on the axis 508, where the valve assembly 502 is positioned about, such as around, the axis 508. The axis 508 may therein be a central axis for the valve assembly 502. Likewise, the axis 508 is a longitudinal axis and may be a rotational axis for rotational elements of the valve assembly 502. The assembly 502 may have a first side 504 and a second side 506, where the first side 504 is opposite to the second side 506. A line 510, line A-A, may extend across the valve assembly 502. The line 510 may be vertical. A sectional view may be taken on line 510.

The valve assembly 502 includes a passage 512 and walls 514. The passage 512 may house the valve 262. The passage 512 may include all or a portion of the first chamber 246, the second chamber 247, and/or the third chamber 251 of FIGS. 2A-2B. Walls 514 may be tubular and cylindrical in shape. Likewise, the passage 512 may be cylindrical in shape. Walls 514 may curve radially about the passage 512, and the passage 512 may be radially about the axis 508. The walls 514 may have an outer surface 516 and an inner surface 518. The inner surface 518 may be the surface of the passage 512. The outer surface 516 and the inner surface 518 may be cylindrical and tubular in shape.

The assembly includes an anti-spin feature 522. The anti-spin feature 522 may be a component, such as an attachment, that is separate from the valve 262 and the walls 514. The anti-spin feature 522 may be a rigid structure, such as a clip or a fastening component. The anti-spin feature 522 may be fit to a first slot 524 and a second slot 526 of the walls 514. The first slot 524 and the second slot 526 are arranged to be centered about a second axis 528, such that centerlines of the first slot 524 and the second slot 526 are approximately coaxial with the second axis 528. The second axis 528 may be vertical. The line 510 may divide the anti-spin feature 522, the first slot 524, and the second slot 526. The anti-spin feature 522 may prevent spinning of the valve 262, such as when valve 262 is housed in the passage 512.

The first land 272 may include a first surface 532 and a second surface 534, where the first surface 532 and the second surface 534 are included by opposite sides of the first land 272. Likewise, the second land 274 may include a third surface 536 and a fourth surface 538, where the third surface 536 and the fourth surface 538 are included by opposite sides of the first land 272. The second surface 534 and the third surface 536 may extend radially from the core 270.

The passage 512 may be a first diameter 540. The first land 272 and the second land 274 may be a second diameter 542 and a third diameter 544, respectively. The core 270 may be a fourth diameter 546. The second diameter 542 may be approximately the same as the first diameter 540, such that the first land 272 may fluidly seal with the passage 512 and the inner surface 518. Likewise, the third diameter 544 may be approximately the same as the first diameter 540, such that the second land 274 may fluidly seal with the passage 512 and the inner surface 518. The first diameter 540 and the second diameter 542 may be approximately equal. With the second diameter 542 and the third diameter 544 approximately equal, a first differential area of the first surface 532 and a second differential area of the fourth surface 538 are approximately equal. Additionally, the fourth diameter 546 may be approximately constant. A third differential area of the second surface 534 and a fourth differential area of the third surface 536 may be approximately equal. A pressure may act upon equal differential areas with the same amount of force. The equal differential areas of the second surface 534 and the third surface 536, may prevent a pressure between the second and third surfaces 534, 536 from pushing the valve 262 in the first direction 212 or the second direction 214.

Alternatively, the first differential area of the first surface 532 may be less than the second differential area of the fourth surface 538. For example, if the valve 262 includes the appendage 276 extending from the first surface 532, the first differential area of the first surface 532 may be less than the second differential area of the fourth surface 538. When a first pressure chamber including the fourth surface 538 and a second pressure chamber including the first surface 532 have the same pressure, the more a first force from the pressure placed on the fourth surface 538 may be greater than a second force from the pressure placed on the first surface 532, driving the valve 262 in a direction toward the second side 506.

Turning to FIG. 6, a fourth view 600 is shown of the valve assembly 502 including the valve 262. The fourth view 600 is a sectional view that is taken on the first line 510 of FIG. 5, where a view plane of the first line 510 is parallel with another plane formed by the x and z axes of the reference axes 201. A second line 610, line B-B, may extend across the valve assembly 502. The second line 610 may be vertical and may divide the anti-spin feature 522 and the first slot 524.

The valve 262 includes a passage 622 and a third slot 624. The passage 622 may be a through passage, extending through the valve 262 from an end closest to the first side 504 to an end closest to the second side 506. The passage 622 may be around the axis 508. The passage 622 may have an opening contiguous with and extend from the fourth surface 538. For an example, the passage 622 may extend to have an opening contiguous with a surface of appendage 276, where the surface is normal to the axis 508. For another example, the passage 622 may extend to and have an opening contiguous with the first surface 532. The anti-spin feature 522 may be fit to the third slot 624. The third slot 624 may have a first opening 628 and a second opening 630 at an outer surface 626 of the valve 262. The first opening 628 and the second opening 630 may receive the anti-spin feature 522. When housed by the first slot 524, the second slot 526, and the third slot 624, the anti-spin feature 522 may abut the surfaces of the first slot 524, the second slot 526, and the third slot 624. The anti-spin feature 522 may rigidly couple to the valve 262, such as via being received by the third slot 624. The anti-spin feature 522 may rigidly couple the valve 262 to the walls 514, such as when the anti-spin feature is received by the first slot 524, the second slot 526, and the third slot 624. The anti-spin feature 522 may therein lock the valve 262 with the walls 514.

The passage 622 may include a first surface 642 and a second surface 644. The passage 622 may have a partially circular shape. The first surface 642 may be curved, having a curvature with a radius 652. The radius 652 may extend from and be radial with respect to the axis 508. The radius 652 may extend to the first surface 642. The second surface 644 may be flat. The second surface 644 may have an area parallel with a plane formed by the y-axis and z-axis of the reference axes 201.

In this way, a lubrication distribution system of a transmission system is disclosed with a main lubrication line and a selective lubrication line that transport lubricant to the clutch pack and counter-pressure chamber of a clutch, where the main lubrication line is open to a lubricant source and the selective lubrication line may be selectively open and closed to the lubricant source via a spool valve. A rotating component (e.g., a drive component) that drives the clutch includes the main lubrication line and the selective lubrication line, and the rotating component houses the spool valve. The main lubrication line is a fluid passage of the drive component. The rotating component may be a shaft. The spool valve is pressure activated, and the spool valve may be open to a pressure source through a port of the shaft. The pressure source may be the pressure source to supply a work fluid to advance a piston of the clutch from an end stop toward the clutch pack, where a clutch line fluidly coupled to an actuation chamber for the piston fluidly couples to the pressure source. Therein, the spool valve may be opened via the pressure to close the clutch. The spool valve may also be opened by a hydraulic load, such as a centripetal load when the rotating component is rotated at speeds above a threshold. The spool valve incorporates a passage that fluidly couples the pressure source and port to the clutch line. The spool valve is coupled to and contacts an anti-spin feature, that prevents the spool valve from rotating or spinning. The spool valve includes a fluid passage that may fluidly couple a pressure source to the clutch line. A cavity housing the spool valve may be separated into a plurality of chambers, including an actuation chamber where force from pressure may shift the spool valve to an open state, a counter-pressure chamber to resist force from the actuation chamber and return the spool valve to a close state, and a lubricant flow chamber via which lubricant may flow from a lubricant source to the selective lubrication line.

FIG. 7 and FIG. 9 show a plurality of timing diagrams for operating sequences for shifting gears in a transmission. FIG. 7 shows a plurality of timing diagrams 700 of a first operating method for shifting gears, where the first operating method is a normal method using a standard control routine. FIG. 9 shows a plurality of timing diagrams 900 of a second operating method for shifting gears, where the second operating method is a method using a pre and/or post cooling control routine. During the pre and/or post cooling control routine, there may be a pre-cooling phase before opening the wet clutch and post-cooling phase before opening the wet clutch where additional lubricant is flowed to the wet clutch.

The operating sequences for the timing diagrams 700 of FIG. 7 and the timing diagrams 900 of FIG. 9 may be provided via the systems and components of FIGS. 1-6. The operating sequences of a shifting gears for the timing diagrams 700 and the timing diagrams 900 are for a clutch assembly of the present disclosure, such as a clutch assembly 416 of FIGS. 4A-4B. The clutch assembly is of a configuration that includes a spool valve to change the volume of lubricant that may be passed through the spool valve to the lubrication passages/lines. The clutch assembly includes a first fluid passage and a second fluid passage for transporting lubricant. The spool valve may be the valve 262 of FIGS. 2A-3B and may be a part of the valve assembly 502 of FIGS. 5-6. The first fluid passage is a primary lubrication line supplied, such as the second fluid passage 244 of FIGS. 2A-2B. The second fluid passage is a selective lubrication line, such as the third fluid passage 348 of FIGS. 3A-3B.

Axes of each plot of the timing diagrams 700 (e.g., first trace 702, second trace 704, third trace 706, and fourth trace 708) and each plot of the timing diagrams 900 (e.g., first trace 902, second trace 904, third trace 906, and fourth trace 908) may increase in the directions indicated by arrows of the axes. For example, for timing diagrams 700, time may increase horizontally along all four plots from t0 to t3 with intervals between the times marked. Likewise, for timing diagrams 900, time may increase horizontally along all four plots from t0-t5. The plots are time aligned, such that first trace 702, second trace 704, third trace 706, and fourth trace 708 of timing diagrams 700 and first trace 902, second trace 904, third trace 906, and fourth trace 908 show change in a variable over time. The horizontal axis of each plot represents time and time increases from the left side of the plot to the right side of each plot. The vertical lines at times t0-t3 represent times of interest during the operating sequence of the timing diagrams 700 of FIG. 7. Likewise, the vertical lines at times t0-05 represent times of interest during the operating sequence of the timing diagrams 900 in FIG. 9.

It is to be understood that time represents relative time such that t1 is some time after t0, t2 is some time after t1, and so on, but does not indicate specific or proportional quantities of time. For example, although t2 and t3 are spaced further apart on the timing diagrams 700 than t1 and t2, the interval between t2 and t3 may be relatively less than the interval between t1 and t2. Further, timing diagrams 700 and timing diagrams 900 show an example of various measurements during operation of the clutch, the valve, and pressure to the clutch, but does not limit the operation of the clutch, the valve, or pressure to the clutch. For example, in the timing diagrams 700 of FIG. 7 between t0 and t1, fourth trace 708 shows the pressure on a clutch rises as a step function to a closed pressure in an infinitesimally small amount of time. However, with different embodiments of the valve, shape of the increase in pressure to the clutch may appear differently, such as having a shallower linear slope or a more parabolic slope in shape.

First trace 702 of FIG. 7 and first trace 902 of FIG. 9 represents the state of a transmission over time, where the state of the transmission is the ratio (e.g., gear) the transmission selects. The transmission may be the transmission 108 of FIG. 1 and/or the transmission 404 of FIGS. 4A-4B. The ratio being selected may be for a gearset, such as the gearset 428 of FIGS. 4A-4B. When first trace 702 or first trace 902 is at tick labeled first gear on the vertical axis, the transmission is signaled to enter or remain in a first gear, where the transmission selects and transmits rotational energy via the first gear. When first trace 702 is at a tick labeled second gear on the vertical axis, the transmission signaled to enter or remain in a second gear, where the transmission selects and transmits rotational energy via the second gear. In first gear a first gearset may be selected; the first gearset may be the gearset 428. In second gear, a second gearset may be selected. First trace 702 or second trace 904 may switch to a first gearset of the first gear and the second tick at or above a first threshold signal 712. Likewise, first trace 702 or second trace 904 may switch to a second gearset of the second gear and the second tick at or below a second threshold signal 714. The command signal to change the state of the transmission from first gear to the second gear, may be changed via user input (e.g., an operator input). A command signal, such as shift command, to change the gear of the transmission may be input via shifting device, such as an automatic gear shifter, a manual gear shifter, or shift input device of input devices 164 of FIG. 1.

Second trace 704 represents clutch states for a standard control routine. Second trace 904 represents clutch states for a pre and/or post cooling control routine. The clutch states of second trace 704 and second trace 904 are closed and open, represented by a closed and an open tick, respectively. The clutch may be a clutch of the clutch assembly 416 of FIGS. 4A-4B. The clutch may be closed in a closed state, where rotational energy and power may be transferred across the clutch. The clutch may be open in an open state, where rotational energy and power are not transferred across the clutch. The clutch may be closed and at the closed tick when second trace 704 or second trace 904 are at or above a third threshold signal 722. The clutch may be open and at the open tick when second trace 704 or second trace 904 are at or below a fourth threshold signal 724. In the closed state, the clutch may drivingly couple the first input to the first gearset. The clutch may be open an open state, where rotational energy and power may not transfer across the clutch.

Third trace 706 represents valve states for the valve for a standard control routine. Third trace 906 represents valve states for the valve for a pre and/or post cooling control routine. The valve may be open or closed, represented by an open tick and a closed tick, respectively. When open, the valve is in an open mode, where fluid may flow to a selective lubrication line. When closed, the valve is in a closed mode, where fluid where the valve seals the selective lubrication line such that fluid may not flow to and through the selective lubrication line via the valve. The clutch may be closed at or above the closed tick when third trace 706 or third trace 906 is at or above a fifth threshold signal 732. The clutch may be open at or below the open tick when third trace 706 or third trace 906 is at or below a sixth threshold signal 734. The relationship between third trace 706 and second trace 704 may be inversely proportional, where third trace 706 enters the valve into an open state when the second trace 704 enters the clutch into a closed state, and vice versa. Likewise, the relationship between third trace 906 and second trace 904 may be inversely proportional, where third trace 906 enters the valve into an open state when the second trace 904 enters the clutch into a closed state, and vice versa. The valve and the selective lubrication line may be the valve 262 and the third fluid passage 348 of FIGS. 2A-3B Fourth trace 708 represents pressure placed on the clutch and a piston of the clutch for a standard control routine. Fourth trace 908 represents pressure placed on the clutch and a piston of the clutch for a pre and/or post cooling control routine. Fourth trace 708 and fourth trace 908 may fluctuate from at or above closed pressure to a minimum pressure, represented by a closed pressure tick and minimum pressure tick, respectively. At or above the closed pressure, the clutch may close. The pressure may be at or above the closed pressure tick when fourth trace 708 or fourth trace 908 is at or above a first pressure threshold 742. The pressure may be at the minimum pressure tick when fourth trace 708 or fourth trace 908 is at a second pressure threshold 744.

Referring to FIG. 7 specifically, at to the operating sequence begins for the timing diagrams 700. At t0 and between t0 and t1 the gear ratio selected may be indeterminate, where either the second gear ratio is selected or no gear ratio may be selected. For first trace 702, neither the first gear ratio or the second gear ratio is selected. At t0 and between t0 and t1, second trace 704 shows the clutch may be in an open state. Likewise, at t0 and between t0 and t1, third trace 706 shows the valve may be in the closed state. At t0 and between t0 and t1, fourth trace 708 is at the minimum pressure, where the minimum pressure is the starting pressure.

At t1, a signal is sent to shift gears and transition the transmission to drive the first gear ratio, and the first trace 702 begins plotting at the first threshold signal 712. At time t1, second trace 704 increases to the third threshold signal 722, and the clutch enters into a closed state. Likewise, at t1, third trace 706 decreases to the sixth threshold signal 734, and the valve enters an open state. At t1, fourth trace 708 increases to the first pressure threshold 742 and the clutch reaches a close pressure to close. The clutch closes at the close pressure while the valve opens. First trace 702, second trace 704, third trace 706, and fourth trace 708 increase or decrease in a stepwise manner, such that the first gear ratio engages, the clutch closes, the valve opens, and the closed pressure is reached approximately instantaneously. Between t1 and t2 the states of the gear ratio, the clutch, the valve, and the pressure to clutch remain constant as shown by first trace 702, second trace 704, third trace 706, and fourth trace 708, respectively.

At t2 a signal is sent to shift gears and transition the transmission to drive the second gear ratio, and the first trace 702 decrease to the second threshold signal 714. At time t2, second trace 704 decreases to the fourth threshold signal 724 and the clutch enters into an open state. Likewise, at t2, third trace 706 increases to the fifth threshold signal 732 and the valve enters a closed state. At t2, fourth trace 708 decreases to the second pressure threshold 744, and the clutch decrease below the closed pressure to open. The clutch opens at the minimum pressure while the valve closes. First trace 702, second trace 704, third trace 706, and fourth trace 708 increase or decrease in a stepwise manner, such that the first gear ratio disengages, the clutch opens, the valve closes, and the minimum pressure is reached approximately instantaneously. Between t2 and t3 the states of the gear ratio, the clutch, the valve, and the pressure to clutch remain constant as shown by first trace 702, second trace 704, third trace 706, and fourth trace 708, respectively. At t3 the operating sequence ends.

Turning to FIG. 8, graph 800 is shown. Graph 800 is a timing diagram of control signals and pressure on a clutch assembly. The graph 800 may illustrate a method of an operation changing the states of the clutch assembly with a pre and/or post cooling phase. Graph 800 includes a first axis 810 showing time, a second axis 812 showing pressure, and a third axis 814 showing a signal. The pressure of the second axis 812 is a clutch pressure, where the clutch pressure is pressure to a piston of a piston assembly and a clutch assembly, such as the piston 436 of the piston assembly 418 and the clutch assembly 416 of FIGS. 4A-4B. The pressure of second axis 812 is the net pressure to an actuation chamber, such as the actuation chamber 432 of FIGS. 4A-4B. As a net pressure, a pressure opposing the pressure in the actuation chamber, such as a pressure in a counter-pressure chamber, may subtract from the pressure of a trace plotted with second axis 812. The counter-pressure chamber may be the counter-pressure chamber 434 of FIGS. 4A-4B. The signal of the third axis 814 may be a signal to open a first valve. The first valve may supply work fluid to the piston assembly and the clutch assembly, such as the first valve 412 FIGS. 4A-4B. The first valve may be a solenoid valve and the signal of the third axis 814 may be a solenoid signal. The first valve may be referred to as a piston valve, herein. The vertical lines at times t0-t11 represent times of interest during the operating sequence.

Graph 800 includes two traces, a first trace 816 and a second trace 818, shown in graph 800 and in a figure legend 820. The first trace 816 is clutch pressure over time. The first trace 816 is represented by unbroken lines. The first trace 816 is at a minimum pressure at a tick 826 on the second axis 812. The minimum pressure at the tick 826 may be a minimum pressure to the piston chamber, such as when the valve is closed and the piston is fully retracted to an end stop. For an example, the tick 826 and the minimum pressure of the piston chamber may be 0 bar. The second trace 818 is a representation of signal of the third axis 814 over time of the first axis 810. The second trace 818 is represented by dotted lines. The first trace 816 shows the change in pressure to the piston over time. The second trace 818 shows the change in state of the piston valve over time, where the piston valve may change states approximately instantaneously with the signal. The piston valve may be at a first state at a first tick 822 on the third axis 814, where the signal of the second trace 818 is at a current to close the piston valve. The piston valve may be at a second state at a second tick 824 on the third axis 814, where the signal of the first trace 816 is at a current to open the piston valve.

Axes of graph 800 (e.g., the first axis 810, the second axis 812, and the third axis 814) may increase in the directions indicated by arrows of the axes. For example, time may increase horizontally along the first axis 810 from t0 to t11 with intervals between the times marked. The plots are time aligned, such that a variable of a first trace 816 and a variable of a second trace 818 change over time. It is to be understood that time represents relative time such that t1 is some time after t0, t2 is some time after t1, and so on, but does not indicate specific or proportional quantities of time. For example, although t2 and t3 are spaced further apart on graph 800 than t1 and t2, the interval between t2 and t3 may be relatively less than the interval between t1 and t2. Further, graph 800 shows an example of various measurements during operation of the clutch, the piston valve, and pressure to the clutch, but does not limit the operation of the clutch, the piston valve, or pressure to the clutch. For example, between t2 and t3, the first trace 816 shows the pressure on a clutch decreases with a linear slope. However, with different embodiments of the piston valve and the counter-pressure chamber, shape of the first trace 816 may appear differently, such as having a shallower or steeper linear slope or a more parabolic slope in shape.

A method for the clutch state operation may begin at t0. T0 is the start time for the graph 800. At t0 the first trace 816 may be at a minimum pressure at the tick 826, and the second trace 818 may be at the first tick 822 for the piston valve to be in a closed state. Between t0 and t1 the state of the first trace 816 and the second trace 818 remain constant and do not decrease or increase along the second axis 812 and third axis 814, respectively. At t1, the signal of second trace 818 increases along the third axis 814 to the second tick 824. At the second tick 824, the piston valve for the piston enters the second state, where the piston valve opens. Between t1 and t9 the second trace remains at the second tick 824 and the piston valve is in the open state. When the piston valve is open, fluid may flow and pressure may increase to an actuation chamber of the piston. Between t1 and t2, the pressure of the piston may remain at the minimum pressure at the tick 826, which may represent a delay for fluid and/or pressure to travel from a pressure source through the piston valve and to the actuation chamber. At t2, the pressure may begin to increase to the actuation chamber, and the pressure of the first trace 816 may start to increase. Between t2 and t3, the pressure of the first trace 816 may increase. Between t2 and t3, the pressure of the first trace 816 may increase to a lift pressure 832, where the pressure of the first trace 816 may start actuating the piston toward the clutch assembly from the end stop of the piston chamber. It is to be appreciated, that lift pressure may be achieved via a high hydraulic load, such as a hydraulic load from an electric machine. A pressure range between the minimum pressure at the tick 826 and the lift pressure 832. Alternatively, it is to be appreciated that the time between t1 and t2 may be infinitesimally small, and for these examples the t1 and t2 may share a vertical line or another t value in place of t1 and t2.

At t3 the pressure of the first trace 816 may reach a first pressure plateau 834 where the pressure of the first trace 816 stops increasing. Between t3 and t4 the pressure of the first trace 816 remains constant. At t4 the first pressure plateau 834 ends and the pressure of the first trace 816 begins to decrease. At t4 a counter pressure from the counter-pressure chamber may increase decreasing the net pressure on the piston. The pressure to the counter-pressure chamber may be increased by opening a lubrication valve and a selective lubrication line, such as the valve 262 and the third fluid passage 348 of FIGS. 2A-3B. Between t4 and t5 the pressure the first trace 816 may continue to decrease. Pressure may increase to the counter-pressure chamber at a faster rate than to the actuation chamber. At 15, the pressure between the actuation chamber and the counter-pressure chamber may equalize. Between t5 and t6 the pressure may remain constant. Between t5 and t6 the piston may continue to advance toward the clutch of the clutch assembly. Likewise, between t5 and t6 the piston may touch the clutch, but not press and compress the clutch. At t6 the pressure of the first trace 816 may increase to a kiss pressure, where the kiss pressure 836 is a threshold of pressure to move the piston against and compress the clutch of the clutch assembly.

Between t6 and t7 the pressure of the first trace 816 increases, as the piston experiences resistances and is stopped by the clutch, a spring of the counter-pressure chamber, and the pressure of lubricant of the counter-pressure chamber. At t7, the first trace 816 has an inflection point 838, where the slope becomes greater and the pressure of the first trace 816 increases at a greater rate. At the inflection point 838 and the inflection point, the clutch of the clutch assembly may close, where the friction plates and the separator plates and the clutch pack may not be compressed further. Between t7 and t8, the pressure of the first trace 816 continues to increase at the increased rate. At 18 the pressure of the first trace 816 may reach a second pressure plateau 840 where the pressure of the first trace 816 stops increasing. Between t8 and t10, the pressure may remain constant and the pressure plateau may continue. At 19, the signal of second trace 818 decreases along the third axis 814 to the first tick 822. At the first tick 822, the piston valve for the piston enters the first state, where the piston valve closes. Between t9 and t10, the pressure of the piston may remain at the second pressure plateau 840, which may represent a delay for fluid and/or pressure wave to end after the piston valve closes. At t10 the pressure decrease rapidly in an infinitesimally small period of time to the minimum pressure at the tick 826. As the pressure of the first trace 816 decreases below the lift pressure, the lubrication valve may close, closing the selective lubrication line to the clutch assembly. Between t10 and t11, the pressure of the first trace 816 remains at the minimum pressure and the tick 826. At t11, the first trace 816 and the second trace 818 may end. Likewise, the method for the operation represented by graph 800 may end.

Returning to FIG. 9, at to the operating sequence begins for the timing diagrams 900. At t0 and between t0 and t2 the gear ratio selected may be indeterminate, where either the second gear ratio is selected or no gear ratio may be selected. For first trace 902, neither the first gear ratio or the second gear ratio is selected between t0 and t2. At t0 and between t0 and t2, second trace 904 shows the clutch may be in an open state. Likewise, at t0 and between t0 and t1, third trace 906 shows the valve may be in the closed state. At t0 and between to and t1, fourth trace 908 is at the minimum pressure, where the minimum pressure is the starting pressure.

At t1, a pre-cooling phase begins for the clutch. At t1, third trace 906 decreases to the sixth threshold signal 734, and the valve enters an open state. At t1, fourth trace 908 increases to a third pressure threshold 952. At or above the third pressure threshold 952, fourth trace 908 increases to or above an activation pressure, respectively. The activation pressure is marked by an activation pressure tick on the clutch pressure axis. The activation pressure is a pressure the piston overcomes to advance toward and compress the clutch pack of the clutch. A pressure of the piston chamber may be greater than the activation pressure to advance the piston toward the clutch pack. The activation pressure may prevent self-closing. At t1 the clutch pressure increases to or above the third pressure threshold 952, but does not close the clutch. The third trace 906, and fourth trace 908 increase or decrease in a stepwise manner, such that the valve opens and the activation pressure is reached approximately instantaneously at t1. Between t1 and t2 the states of the gear ratio, the clutch, the valve, and the pressure to clutch remain constant as shown by first trace 902, second trace 904, third trace 906, and fourth trace 908, respectively. Between t1 and t4, third trace 906 and the valve state remain constant. Between t1 and t2, fourth trace 908 and the pressure on the piston remain constant.

At t2, a signal is sent to shift gears and transition the transmission to drive the first gear ratio. At t2, first trace 902 shows the transmission system is commanded to switch to the first gear ratio. At t2, second trace 904 increase the third pressure threshold 952 and the clutch enters into a closed state. At t2, fourth trace 908 and the piston pressure increases to the close pressure. At t2 first trace 902, second trace 904, and fourth trace 908 increase or decrease in a stepwise manner, such that the gear ratio shifts, the clutch closes, and the close pressure is reached approximately instantaneously at t2. Between t2 and t3 the states of the gear ratio, the clutch, and the pressure to clutch remain constant as shown by first trace 902, second trace 904, and fourth trace 908, respectively.

At t3 a signal is sent to shift gears and transition the transmission to drive the second gear ratio. At t3 first trace 902 shows the transmission system is commanded to switch to the second gear ratio. At t3, second trace 904 decreases to the fourth threshold signal 724 and the clutch enters into an open state. At t3, fourth trace 908 decreases to the third pressure threshold 952, where the piston pressure decrease below closed pressure for the clutch to open. The clutch opens at the activation pressure while the valve closes. At t3, first trace 902, second trace 904, and fourth trace 908 increase or decrease in a stepwise manner, such that the first gear ratio disengages, the clutch opens, and the actuation pressure is reached approximately instantaneously. Between t3 and t5 the states of gear ratio and the clutch remain constant as shown by first trace 902 and second trace 904, respectively. Between t3 and t4 the state of pressure to clutch remains constant as shown by fourth trace 908. At t4, third trace 906 increases to the third threshold signal 722 and the valve closes. At t4, fourth trace 908 decreases to the second pressure threshold 744 and the piston pressure decreases to the minimum pressure. Between t4 and t5, the valve state and the piston pressure remain constant as shown by third trace 906 and fourth trace 908. At t5 the operating sequence ends.

FIG. 10 shows a method 1000 for selecting standard control strategy or a pre and/or post cooled control strategies for a clutch that may be lubricated via a selective fluid line using a lubrication valve of the present disclosure, such as the third fluid passage 348 and the valve 262 of FIGS. 3A-3B. The clutch may be part of a clutch assembly, be closed via a piston assembly, and be part of a hydraulic system of the present disclosure, such as the clutch assembly 416, piston assembly 418, and the hydraulic system of hydraulic circuit diagram 402 of FIGS. 4A-4B. The control strategies of method 1000 may supply the clutch and clutch assembly with lubricant for lubrication and cooling. The control strategies of method 1000 may supply work fluid to a piston chamber for actuating a piston of the piston assembly. The lubricant supplied to the clutch assembly may also supplied to a counter-pressure chamber to prevent self-closing of the clutch via preventing the piston contacting a clutch pack. The method 1000 may be implemented by a controller that includes a process and memory, as previously discussed, such as the controller 156 of control system 154 and/or controller 410.

At 1002, the method includes determining operating conditions. The operating conditions may include input device position (e.g., range selector position), clutch configuration, gearbox speed, electric machine speed, vehicle speed, vehicle load, ambient temperature, and the like. The operating conditions may be ascertained via sensor inputs, modeling, look-up tables, and other suitable techniques.

At 1004 the method 1000 measures the temperature of the clutch (e.g., the wet clutch temperature). The temperature of the clutch may be measured via one or more of a plurality of sensors. The sensors 158 of FIG. 1 may include the sensors for monitoring temperature of the clutch. At 1006, the method 1000 determines if the temperature of the clutch is above a first threshold of temperature (e.g., a temperature threshold). If the temperature of the clutch is below the temperature threshold (1006 is NO), the method 1000 continues to 1008.

At 1008, method 1000 determines if the lubrication valve is open to a selective lubrication line. The selective lubrication line may be the third fluid passage 348 of FIGS. 3A-3B and the second fluid line 454 of FIGS. 4A-4B. When open to the selective lubrication line, the lubrication valve applies an activation pressure to the clutch. The pressure of lubricant housed and flowing through the counter-pressure chamber of the clutch assembly may be increased to an activation pressure. The activation pressure is opposite the piston from the actuation chamber, such that the activation pressure applies a force to the piston opposite the direction the piston advances to close the clutch. The activation pressure and the force may prevent the clutch from self-closing, such as at high rotational speeds. However, the additional volumetric flowrate from the selective lubrication line and increased volume of lubricant in the clutch assembly may increase the weight of the rotational element and clutch assembly. The increased weight and splashing of the greater volume of fluid, may result in greater power losses during rotation of a drive component that drives the clutch assembly and houses the lubrication valve, the main lubrication line, and the selective lubrication line. To reduce the flow of lubricant when not desired, the lubrication valve is shut. The increased flow of lubricant may not be desired when the when temperature is below the temperature threshold at 1006. If the lubrication valve is open to the selective line (1008 is YES), method 1000 continues to 1010 where the state of the lubrication valve is changed to switch off the activation pressure. At 1010, the lubrication valve is closed to the selective lubrication line. The pressure in the counter-pressure chamber of the clutch assembly may reduce to a pressure below the activation pressure. Likewise, the volume of lubricant flowing through the drive component and the clutch assembly may decrease. After 1010, method 1000 ends. Returning to 1008, if the lubrication valve is not open to the selective line (1008 is NO), the method 1000 continues to 1012, where no action is taken by the controller and the settings of lubrication valve remain, the piston assembly, and the clutch assembly remain the same. After 1012, method 1000 ends.

Returning to 1006, if the temperature of the clutch is above the temperature threshold (1006 is YES), method 1000 continues to 1022. At 1022 the rotational speed of the drive component is measured. After 1022, method 1000 continues to 1024, where the method 1000 determines if the rotational speed is at or above a second threshold of rotational speed (e.g., a speed threshold). Above the speed threshold, the drive component may apply a load to the clutch that may cause the clutch to self-close. For example, the speed threshold may be a rotational speed of 12,000 rotations per minute (RPM). Above the speed threshold, the pre and/or post cooling method is allowed. Likewise, above the speed threshold, lubrication provided via the selective line is allowed to maximize cooling of the clutch. If rotational speed is not above the speed threshold (1024 is NO), method 1000 continues to 1012. If the rotational speed is above the speed threshold (1026 is YES), method 1000 continues to 1026.

At 1026, the method 1000 determines if a request has been made to actuate the piston and close the clutch. If the clutch is requested to close (1026 is YES), method 1000 continues to 1028 where a signal is sent to open a piston valve so a clutch control pressure is applied to the clutch and piston. The piston valve may be the first valve 412 of FIGS. 4A-4B. The piston valve may fluidly couple a pressure source to the actuation chamber, increasing the actuation chamber to the clutch control pressure. The clutch control pressure acts on the clutch and the piston via a force, advancing the piston in the direction to contact with the clutch. The control pressure also provides a pressure for the lubrication valve to open, flowing lubricant to the selective lubrication line and through the selective lubrication line to the clutch assembly. After 1028, method 1000 ends.

Returning to 1026, if the clutch is not requested to close (1026 is NO) method 1000 continues to 1032, where method 1000 determines if the lubrication valve is open to the selective line. If the lubrication valve is open to the lubrication line (1032 is YES), method 1000 continues to 1012. If the lubrication valve is not open to the lubrication line (1032 is NO), method 1000 continues to 1036, where the lubrication valve is opened via a signal and an activation pressure is applied to the clutch assembly. The signal may be a pressure signal, such as a pressurized flow of fluid from a pressure source. The signal may open the lubrication valve to the selective lubrication line, and lubricant may flow from a lubricant source to and through the lubrication line. The lubricant from the lubricant source is pressurized. The lubricant from the selective lubrication line may increase the volumetric flow of lubricant to the clutch assembly compared to supply via the main lubrication line. The increased volumetric flow may increase lubrication and cooling to the features of the clutch such as the clutch pack. The increased volumetric flow of lubricant that is pressurized increases the pressure of the counter pressure to the activation pressure. For the clutch to close, the pressure in the piston chamber increases above the activation pressure. The activation pressure prevents self-closing of the clutch before the clutch control pressure is reached in the actuation chamber.

It is to be appreciated that for another example of method 1000, after the clutch is requested to close (1026 is YES), that a signal may be sent to apply a clutch control pressure and an activation pressure. For example, at 1028 the opening of the piston valve to the pressure source of the clutch control pressure, may place the pressure source and be in fluidic communication with an actuation chamber of the lubrication valve. The pressure from the pressure source may open the lubrication valve. Therein, opening the piston valve may open the lubrication valve via the clutch control pressure. Opening the lubrication valve flows fluid to the clutch assembly via the selective lubrication line, applying the activation pressure to the clutch assembly. The clutch control pressure is the same clutch control pressure at 1028. Likewise, the activation pressure is the same activation pressure at 1036.

In this way, a method for changing the states of the clutch assembly with a pre and/or post cooling phase is disclosed. The method may be illustrated graphically via a plurality of traces and a graph with two dependent axes. The method illustrates how a first valve that is a solenoid valve and a piston valve may be opened or closed. When signaled open, the first valve may supply work fluid and pressure to an actuation chamber to advance a piston of the clutch assembly. The method illustrates graphically and describes the how signals change a net pressure to a piston of the clutch assembly, where the method changes the net pressure from a minimum pressure, to a lift pressure, to a first plateau of pressure at a first local maximum pressure, to a kiss pressure, to a second plateau of pressure at a second local maximum pressure. The method also describes the effect of opening the first valve on a second valve, where the pressure source from the first valve may open the second valve, and the second valve is a lubrication valve. The second valve fluidly couples to and may open a selective lubrication line to a fluid source.

In this way, a method for selecting and carrying out a normal operation or a pre and/or post cooling phase is disclosed. The method may monitor temperature of a clutch and rotational speed of a drive component to select and provide an activation pressure to a lubrication valve. The lubrication valve is a pressure activated valve and may be a spool valve. If the temperature rises above a temperature threshold, the method may proceed to further cooling methods via lubrication. If the rotational speed increases above a speed threshold and the clutch is not selected for actuation, the method may apply an activation pressure to open the clutch to a selective lubrication line. The selective lubrication line may flow an additional volume of lubricant to lubricate a clutch pack of the clutch, and increase the pressure of lubricant to a counter-pressure chamber. If the speed increases above the speed threshold and the clutch is selected for actuation, the method may apply a clutch control pressure to advance a piston by increasing pressure to an actuation chamber and activate the lubrication valve to open to the selective lubrication line.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system comprising:
   a lubrication valve that fluidly couples a lubrication line in fluidic communication with a multi-disc wet clutch;
   a clutch line in fluidic communication with a clutch actuator of the multi-disc wet clutch and the lubrication valve;
   a clutch control valve fluidly coupled to the clutch line; and
   a controller configured to adjust a pressure of the clutch line to open and close the lubrication valve based on wet clutch temperature.

2. The transmission system of claim 1, where the lubrication valve is a spool valve with an anti-spin feature, where the anti-spin feature rigidly couples the lubrication valve to a structure of the transmission system.

3. The transmission system of claim 2, where the spool valve divides a volume into a first chamber, a second chamber, and a third chamber, where the first chamber is an actuation chamber and in fluidic communication with a pressure source of the clutch line, where the second chamber is in fluidic communication with the lubrication line, where the third chamber is a counter-pressure chamber for the lubrication valve and houses a spring.

4. The transmission system of claim 1, further comprising a drive component that drivingly couples an input to the multi-disc wet clutch, the drive component including a main lubrication line and a selective lubrication line, where the main lubrication line is in fluidic communication with the multi-disc wet clutch, and the selective lubrication line is placed in fluidic communication with the multi-disc wet clutch via opening the lubrication valve.

5. The transmission system of claim 4, where the drive component comprises a cavity that houses the lubrication valve, and the cavity fluidly couples a lubricant source, and the cavity is in selective fluidic communication with the lubrication line via the lubrication valve.

6. The transmission system of claim 5, where the main lubrication line supplies a first fluid flow to the multi-disc wet clutch from the lubricant source.

7. The transmission system of claim 6, where the selective lubrication line supplies a second fluid flow to the multi-disc wet clutch from the lubricant source when the lubrication valve is open.

8. The transmission system of claim 7, further comprising a counter-pressure chamber for the clutch actuator in fluidic communication with the main lubrication line and selective lubrication line.

9. The transmission system of claim 8, where the counter-pressure chamber is pressurized to an activation pressure via the first fluid flow and the second fluid flow.

10. The transmission system of claim 4, where the lubrication valve has a through passage, where the through passage places an actuation fluid source for the clutch control valve and the clutch actuator in fluidic communication with the clutch line.

* * * * *